(12) United States Patent
Jun et al.

(10) Patent No.: US 10,824,564 B2
(45) Date of Patent: Nov. 3, 2020

(54) OPERATION METHOD OF MEMORY CONTROLLER AND OPERATION METHOD OF STORAGE DEVICE INCLUDING THE SAME

(71) Applicant: SAMSUNG ELECTRONICS CO., LTD., Suwon-si (KR)

(72) Inventors: Yu-hun Jun, Suwon-si (KR); Sil Wan Chang, Yongin-si (KR); Heechul Chae, Suwon-si (KR); Seontaek Kim, Suwon-si (KR); In Hwan Doh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 16/007,667

(22) Filed: Jun. 13, 2018

(65) Prior Publication Data

US 2019/0087332 A1 Mar. 21, 2019

(30) Foreign Application Priority Data

Sep. 19, 2017 (KR) ........................ 10-2017-0120594

(51) Int. Cl.
*G06F 12/08* (2016.01)
*G06F 12/0811* (2016.01)
*G06F 3/06* (2006.01)

(52) U.S. Cl.
CPC ........ *G06F 12/0811* (2013.01); *G06F 3/0611* (2013.01); *G06F 3/0656* (2013.01); *G06F 3/0659* (2013.01); *G06F 3/0679* (2013.01); *G06F 2212/1024* (2013.01); *G06F 2212/2022* (2013.01)

(58) Field of Classification Search
CPC .. G06F 12/0811; G06F 3/0611; G06F 3/0656; G06F 3/0659; G06F 3/0679; G06F 2212/1024; G06F 2212/2022
See application file for complete search history.

(56) References Cited

U.S. PATENT DOCUMENTS

| | | | |
|---|---|---|---|
| 7,165,129 B1 * | 1/2007 | Okmianski | G06F 12/0868 710/52 |
| 7,685,342 B2 | 3/2010 | Shiraki et al. | |
| 8,996,450 B1 | 3/2015 | Rubio | |
| 9,229,864 B1 * | 1/2016 | Kanteti | G06F 12/0808 |
| 9,274,966 B1 | 3/2016 | Chahwan et al. | |
| 9,384,123 B2 | 7/2016 | Hida et al. | |
| 9,575,664 B2 | 2/2017 | Chen et al. | |
| 9,959,209 B1 * | 5/2018 | Burton | G06F 11/3058 |
| 2003/0088736 A1 * | 5/2003 | Yun | H04N 21/23406 711/118 |
| 2008/0005490 A1 | 1/2008 | Shiraki et al. | |
| 2011/0066822 A1 * | 3/2011 | Ikeda | G06F 13/4059 711/170 |

(Continued)

FOREIGN PATENT DOCUMENTS

JP 2008-129932 A 6/2008

*Primary Examiner* — Khoa D Doan
(74) *Attorney, Agent, or Firm* — Sughrue Mion, PLLC

(57) ABSTRACT

An operation method of a memory controller which is configured to control a nonvolatile memory device includes receiving a command from the outside, calculating a delay time based on a currently available write buffer, a previously available write buffer, and a reference value, and processing the command based on the delay time.

14 Claims, 15 Drawing Sheets

(56) References Cited

U.S. PATENT DOCUMENTS

| | | | |
|---|---|---|---|
| 2012/0159051 A1 | 6/2012 | Hida et al. | |
| 2013/0031200 A1* | 1/2013 | Gulati | H04L 65/80 709/213 |
| 2013/0290656 A1* | 10/2013 | Staelin | G06F 13/18 711/158 |
| 2016/0210060 A1 | 7/2016 | Dreyer | |
| 2016/0299697 A1 | 10/2016 | Chen et al. | |
| 2016/0371014 A1* | 12/2016 | Roberts | G06F 3/0611 |

* cited by examiner

OPERATION METHOD OF MEMORY CONTROLLER AND OPERATION METHOD OF STORAGE DEVICE INCLUDING THE SAME

CROSS-REFERENCE TO RELATED APPLICATIONS

A claim for priority under 35 U.S.C. § 119 is made to Korean Patent Application No. 10-2017-0120594 filed on Sep. 19, 2017, in the Korean Intellectual Property Office, the entire contents of which are hereby incorporated by reference.

BACKGROUND

Exemplary embodiments described herein relate to a storage device, and more particularly, relate to an operation method of a memory controller and an operation method of a storage device including the same.

Semiconductor memory devices are classified into volatile memory devices, which lose data stored therein at power-off, such as a static random access memory (SRAM), a dynamic RAM (DRAM), and a synchronous DRAM (SDRAM), and nonvolatile memory devices, which retain data stored therein even at power-off, such as a read only memory (ROM), a programmable ROM (PROM), an electrically programmable ROM (EPROM), an electrically erasable and programmable ROM (EEPROM), a flash memory device, a magnetic RAM (MRAM), a resistive RAM (RRAM), a phase-change RAM (PRAM), and a ferroelectric RAM (FRAM).

Nowadays, various techniques are being used to improve performance of a flash memory-based storage device. For example, a storage device stores write data received from a host in a separate buffer memory and notifies the host that the write data are completely stored. Afterwards, the storage device programs the write data stored in the buffer memory in a flash memory. As described above, the storage device improves performance by using various resources (e.g., a buffer memory). However, since the resources are limited (e.g., a limit on a capacity), there is a need for various ways to use resources efficiently while maintaining the performance of the storage device.

SUMMARY

Exemplary embodiments provide an operation method of a memory controller and an operation method of a storage device, capable of improving performance.

According to an aspect of an exemplary embodiment, an operation method of a memory controller which is configured to control a nonvolatile memory device includes receiving a command from an external device, calculating a delay time based on a currently available write buffer, a previously available write buffer, and a reference value, and processing the command based on the delay time.

According to another aspect of an exemplary embodiment, an operation method of a memory controller which is configured to control a nonvolatile memory device includes receiving a command from an external device, calculating a first delay time based on a currently available write buffer, a previously available write buffer, and a reference value, calculating a maximum delay time based on a write buffer release rate representing a difference between a first amount of write buffer released per unit time and a second amount of write buffer allocated per unit time, and processing the command based on the delay time and the maximum delay time.

According to another aspect of an exemplary embodiment, an operation method of a storage device includes receiving a command from an external device, and selectively deferred-processing the command based on a first delay time and a maximum delay time. The first delay time is calculated based on a currently available write buffer, a previously available write buffer, and a reference value, and the maximum delay time is calculated based on a write buffer release rate representing a difference between a first amount of write buffer released per unit time and a second amount of write buffer allocated per unit time.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, exemplary embodiments of the inventive concept may be described in detail and clearly to such an extent that an ordinary one in the art easily implements the inventive concept.

Components described in the detailed description with reference to terms "part", "unit", "module", etc. and function blocks illustrated in drawings may be implemented with software, hardware, or a combination thereof. In an embodiment, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
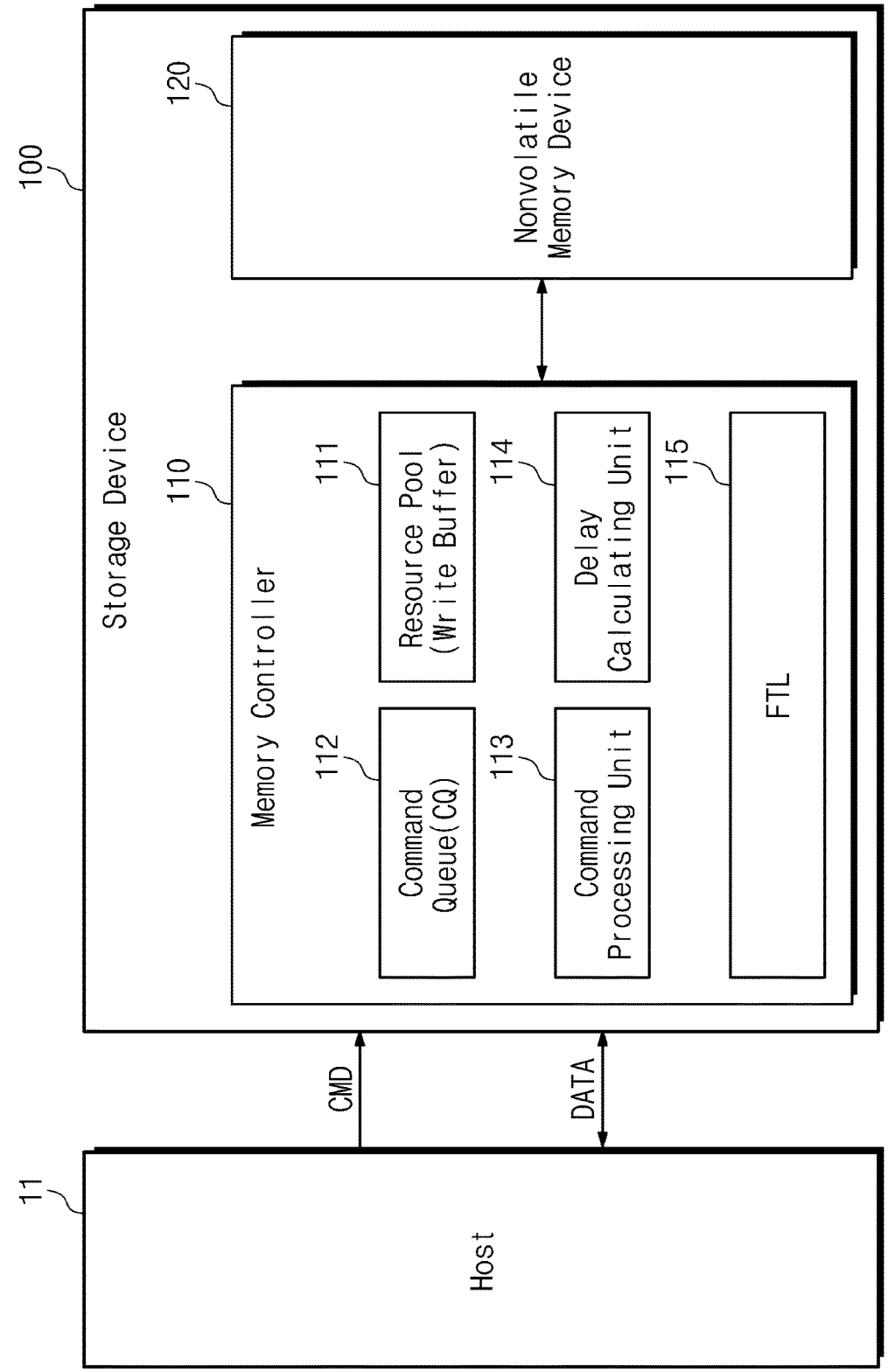
FIG. 1 is a block diagram illustrating a computing system according to an exemplary embodiment.

FIG. 1 is a block diagram illustrating a computing system according to an exemplary embodiment. Referring to FIG. 1, a computing system 10 includes a host 11 and a storage device 100. In an exemplary embodiment, the computing system 10 may be a computing system or an information processing system, such as a computer, a notebook, a server, a workstation, a portable communication terminal, a personal digital assistant (PDA), a portable multimedia player (PMP), a smartphone, or a wearable device. The host 11 may transmit a command CMD to the storage device 100. The host 11 may read data stored in the storage device 100 or may store data in the storage device 100.

The storage device 100 may include a memory controller 110 and a nonvolatile memory device 120. In an exemplary embodiment, the storage device 100 may include a mass storage medium such as a solid state drive (SSD), a memory card, a memory stick, etc.

The memory controller 110 may control the nonvolatile memory device 120 in response to the command CMD from the host 11. Under control of the memory controller 110, the nonvolatile memory device 120 may store data or may provide data stored therein to the memory controller 110.

The memory controller 110 according to an exemplary embodiment may include a resource pool 111, a command queue 112, a command processing unit 113, a delay calculating unit 114, and a flash translation layer (FTL) 115. Below, to describe the exemplary embodiment clearly, it is assumed that the command CMD received from the host 11 is a write command. However, the scope and spirit of the exemplary embodiment may not be limited thereto. For example, the memory controller 110 may receive various commands from the host 11 and may operate depending on the received commands.

The resource pool 111 may include various resources for processing the command CMD from the host 11. For example, the resource pool 111 may include or manage a write buffer, a read buffer, etc. The write buffer, the read buffer, etc., of the resource pool 111 may be allocated (or used) to process the command CMD and may be released (or returned) in an available form after the command CMD is processed. In an exemplary embodiment, the resources of the resource pool 111 may be allocated (or used) or released (or returned) by maintenance operations (e.g., a garbage collection operation, a read reclaim operation, a data recovery operation, and a data backup operation) of the FTL 115. In an exemplary embodiment, the resources of the resource pool 111 may be set upon initializing the storage device 100 or may be changed while the storage device 100 is operating.

The command queue 112 may be configured to queue the command CMD received from the host 11. For example, the command queue 112 may be configured to queue the command CMD from the host 11 depending on a received order or a priority order. Alternatively, the command queue 112 may be configured to queue a received command depending on a preset algorithm.

The command processing unit 113 may be configured to process a command queued in the command queue 112. For example, the command processing unit 113 may fetch at least one command of a plurality of commands queued in the command queue 112 and may process the fetched command. In an exemplary embodiment, that the command CMD is processed by the command processing unit 113 may mean that a write buffer for the command CMD is allocated, e.g., allocating a new write buffer, and write data from the host 11 are stored in the allocated write buffer. Below, operations of allocating an appropriate write buffer and storing write data in the allocated write buffer is referred to as a "command process" by the command processing unit 113. That is, processing, at the command processing unit 113, the command CMD may include allocating a write buffer for the command CMD and storing write data in the allocated write buffer.

As described above, the command processing unit 113 may process a fetched command by allocating a part of the write buffer included in the resource pool 111. In this case, if an available write buffer of the resource pool 111 is insufficient, since the command processing unit 113 fails to process the fetched command, the command processing unit 113 may process the fetched command after an available write buffer is secured.

In an exemplary embodiment, as described above, in the case where the maintenance operation of the FTL 115 is performed, since a write buffer is allocated with regard to the maintenance operation, an available write buffer of the resource pool 111 may be insufficient. In this case, since the fetched command is processed after an available write buffer is secured, a delay time, e.g., a first delay time, associated with the fetched command may sharply increase. That is, a delay time associated with a command may sharply increase under a specific condition (e.g., a condition in which a garbage collection operation is performed) of the storage device 100.

The command processing unit 113 according to an exemplary embodiment may process (or deferred-process) a fetched command based on a delay time that is calculated by the delay calculating unit 114. For example, the delay calculating unit 114 may calculate a delay time based on the size of a currently available write buffer (e.g., first size), size of a previously available write buffer (e.g., a second size), and a reference value of the resource pool 111. That is, both the size of the currently available write buffer and a variation of an available write buffer may be applied to the delay time calculated by the delay calculating unit 114. Accordingly, in the case where the fetched command is processed on the basis of the calculated delay time, an available write buffer may be secured upon processing each command, thereby preventing a sharp increase in a delay associated with the command CMD under the specific condition. A delay time calculating operation of the delay calculating unit 114 will be more fully described with reference to FIGS. 3 and 4.

As described above, the command processing unit 113 may process a command based on the calculated delay time, thereby preventing a sharp increase in a delay time associated with the command.

The FTL 115 may perform an operation on the nonvolatile memory device 120 based on the command CMD processed by the command processing unit 113. In an exemplary embodiment, the FTL 115 may provide an interface between the host 11 and the nonvolatile memory device 120 such that the nonvolatile memory device 120 is efficiently used. The FTL 115 may translate a logical address provided from the host 11 to a physical address usable in the nonvolatile memory device 120. The FTL 115 may perform the address translation operation through a mapping table (not illustrated).

In an exemplary embodiment, as described above, the FTL 115 may perform maintenance operations such as a garbage collection operation, a read reclaim operation, a data recovery operation, and a data backup operation. In this case, to perform a maintenance operation, the FTL 115 may allocate (or use) a resource (e.g., a write buffer) of the resource pool 111 and may release (or return) the allocated (or used) resource after the maintenance operation is completed.

As described above, the storage device 100 according to an exemplary embodiment may calculate a delay time based on the sizes of a write buffer allocated in a current state and a previous state of the resource pool 111 and a reference size and may deferred-process a command in a first operation, i.e., in a deferred-processing, based on the calculated delay time, thereby preventing a sharp increase in a delay under a specific condition. Such a command would be a command that has been deferred-processed.

Figure 2:
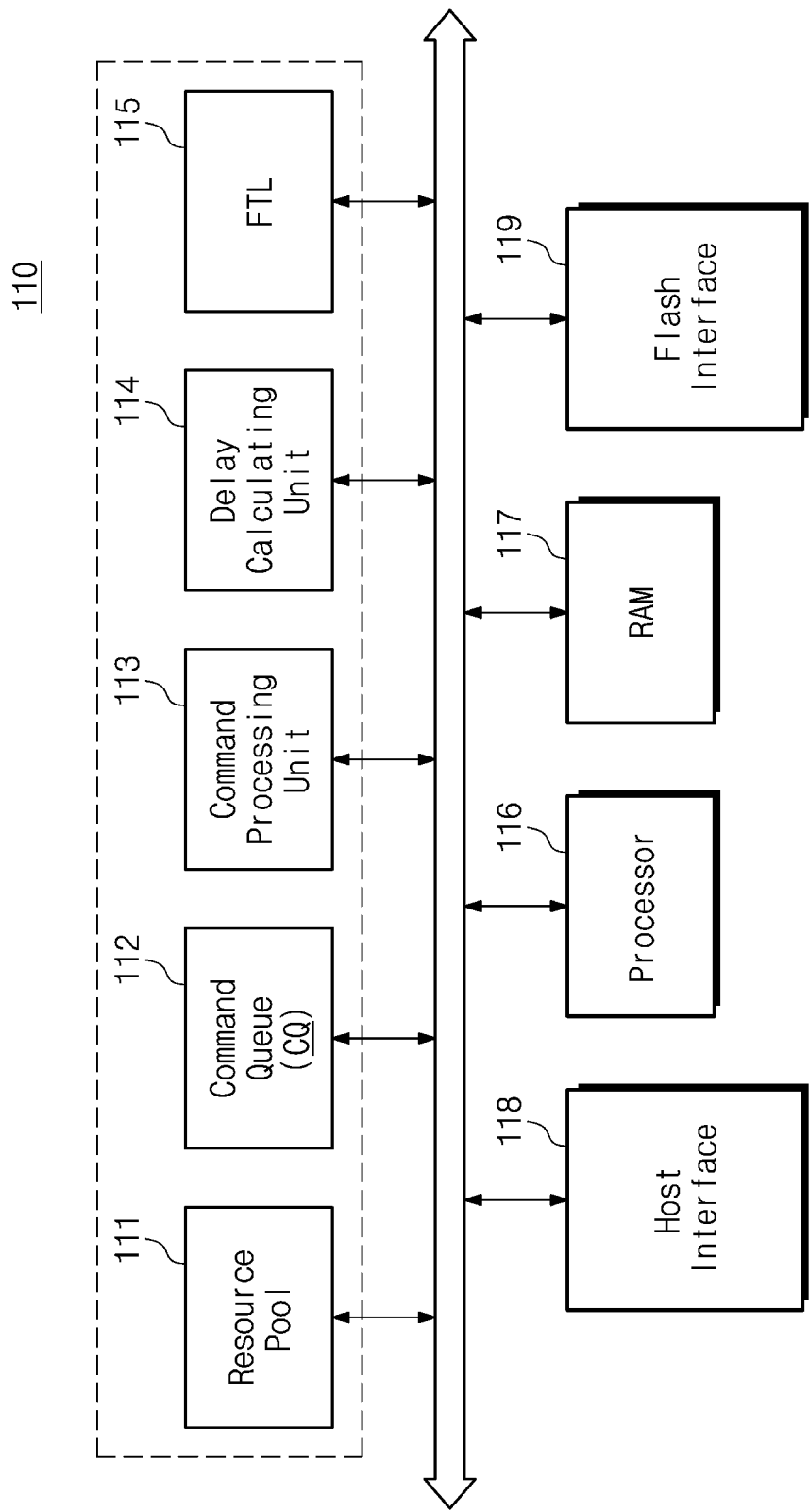
FIG. 2 is a block diagram illustrating a memory controller of FIG. 1.

FIG. 2 is a block diagram illustrating the memory controller 110 of FIG. 1. Referring to FIGS. 1 and 2, the memory controller 110 may include the resource pool 111, the command queue 112, the command processing unit 113, the delay calculating unit 114, the FTL 115, a processor 116, a random access memory (RAM) 117, a host interface 118, and a flash interface 119. The resource pool 111, the command queue 112, the command processing unit 113, the delay calculating unit 114, and the FTL 115 are described with reference to FIG. 1, and thus, a detailed description thereof will not be repeated here.

The processor 116 may perform overall operations of the memory controller 110. The RAM 117 may store a variety of information needed for the memory controller 110 to operate. In an exemplary embodiment, the RAM 117 may be a write buffer included in the resource pool 111 or a write buffer managed by the resource pool 111. However, the scope and spirit of the exemplary embodiment may not be limited thereto. For example, a write buffer that is included in the resource pool 111 or is managed by the resource pool 111 may be a separate buffer memory.

In an exemplary embodiment, each of the resource pool 111, the command queue 112, the command processing unit 113, the delay calculating unit 114, and the FTL 115 may be implemented in the form of a software configuration, a hardware configuration, or a combination thereof. In the case where the resource pool 111, the command queue 112, the command processing unit 113, the delay calculating unit 114, and the FTL 115 are respectively implemented with software configurations, the software configurations may be stored in the RAM 117, and the software configurations stored in the RAM 117 may be driven by the processor 116.

The memory controller 110 may communicate with the host 11 through the host interface 118. In an exemplary embodiment, the host interface 118 may include at least one of various interfaces such as a double data rate (DDR) interface, an universal serial bus (USB) interface, a multimedia card (MMC) interface, an embedded MMC (eMMC) interface, a peripheral component interconnection (PCI) interface, a PCI-express (PCI-E) interface, an advanced technology attachment (ATA) interface, a serial-ATA interface, a parallel-ATA interface, a small computer small interface (SCSI), an enhanced small disk interface (ESDI), an integrated drive electronics (IDE) interface, Firewire, an universal flash storage (UFS) interface, a nonvolatile memory express (NVMe) interface, and other interfaces. The memory controller 110 may be configured to communicate with the nonvolatile memory device 120 through the flash interface 119.

Figure 3:
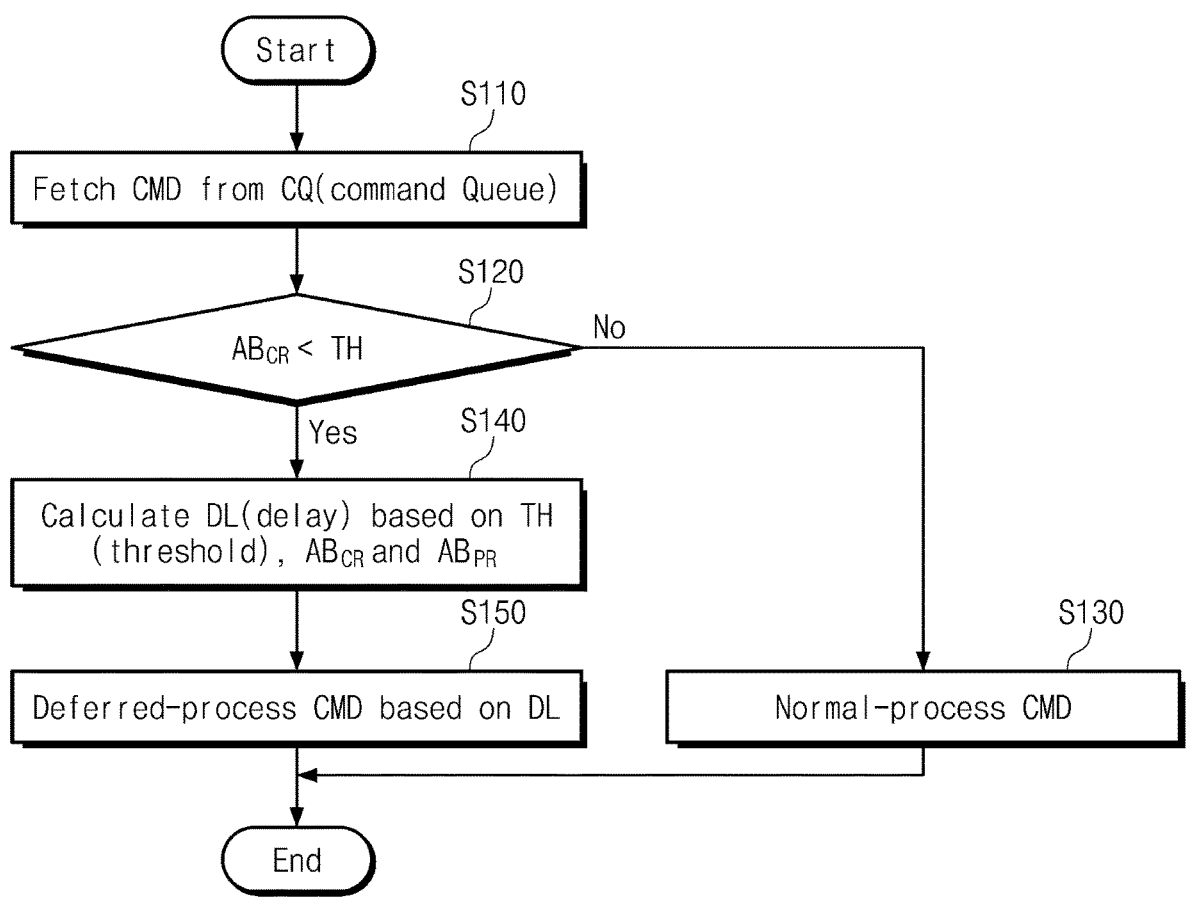
FIG. 3 is a flowchart illustrating an operation method of the memory controller of FIG. 1.

FIG. 3 is a flowchart illustrating a method of operation of the memory controller 110 of FIG. 1. Below, for a brief description, an exemplary embodiment will be described on the basis of an operation method of the memory controller 110. However, the scope and spirit of the exemplary embodiment may not be limited thereto. For example, performing operations of the flowchart of FIG. 3 may be respectively by the memory controller 110, by respective components included in the memory controller 110, or by the processor 116 of the memory controller 110 driving software.

Below, for a brief description, the terms "currently available buffer $AB_{CR}$" and "previously available buffer $AB_{PR}$" are used. The currently available buffer $AB_{CR}$ refers to a write buffer (i.e., a write buffer not allocated for a specific operation or a write buffer capable of being allocated for the specific operation) usable at a current state or a current time, and the previously available buffer $AB_{PR}$ refers to a write buffer usable at a previous state.

Also, for convenience of description, the size of the currently available buffer $AB_{CR}$ may be referred to as the "currently available buffer $AB_{CR}$", and the size of the previously available buffer $AB_{PR}$ may be referred to as the "previously available buffer $AB_{PR}$". That is, that the currently available buffer $AB_{CR}$ is referred to as a "specific value" means that the size of the currently available buffer $AB_{CR}$ is the "specific value". However, the above-described values and assumptions are to describe the technical idea of the exemplary embodiments briefly and clearly, and the scope and spirit of the exemplary embodiments may not be limited thereto.

Referring to FIGS. 1 and 3, in operation S110, the memory controller 110 may fetch a command CMD from the command queue 112. For example, the command queue 112 may be configured to queue a plurality of commands from the host 11. The command processing unit 113 may fetch at least one command CMD of the plurality of commands queued in the command queue 112. In an exemplary embodiment, the command queue 112 may be omitted. In this case, an operation of fetching a command may be replaced with an operation of receiving a command from the host 11.

In operation S120, the memory controller 110 may determine whether the currently available buffer $AB_{CR}$ is smaller than a reference value TH. For example, the delay calculating unit 114 of the memory controller 110 may monitor the resource pool 111 to sense the currently available buffer $AB_{CR}$. The resource pool 111 may determine whether the currently available buffer $AB_{CR}$ is smaller than the reference value TH. In an exemplary embodiment, the reference value TH may be a value predefined to maintain the performance of the storage device 100. To maintain the performance of the storage device 100, the size of an available write buffer of the resource pool 111 may be configured to be maintained to greater than the reference value TH.

If the currently available buffer $AB_{CR}$ is not smaller than the reference value TH, in operation S130, the memory controller 110 may normal-process the fetched command CMD in a second operation (i.e., the fetch command CMD may be normal-processed in a normal-processing). For example, that the size of the currently available buffer $AB_{CR}$ is not smaller than the reference value TH may mean that an available write buffer is sufficient in the resource pool 111. Accordingly, the memory controller 110 may allocate a write buffer to the fetched command CMD without a delay time or based on a predefined delay time and may normal-process the fetched command CMD in a normal-processing. In an exemplary embodiment, the predefined time may be a time predefined by an interface between the host 11 and the storage device 100 or may be a time predefined to maintain the performance of the storage device 100.

If the size of the currently available buffer $AB_{CR}$ is smaller than the reference value TH, in operation S140, the memory controller 110 may calculate a delay time DL based on the currently available buffer $AB_{CR}$, the previously available buffer $AB_{PR}$, and the reference value TH. In an exemplary embodiment, both the size of the currently available buffer $AB_{CR}$ and a variation of an available write buffer may be applied to the delay time DL. A way to calculate the delay time DL will be more fully described with reference to FIG. 4.

In operation S150, the memory controller 110 may deferred-process the command CMD based on the calculated delay time DL. For example, the memory controller 110 may process the command CMD after the delay time DL has elapsed from a time to fetch the command CMD from the command queue 112. As such, as the command CMD is deferred-processed as much as the calculated delay time DL, a write buffer may be secured in the resource pool 111 during the delay time DL. Accordingly, since a sufficient write buffer is secured, a sharp delay of a command under a specific condition (e.g., a garbage collection situation) may be prevented upon processing a command(s) later.

Figure 4:
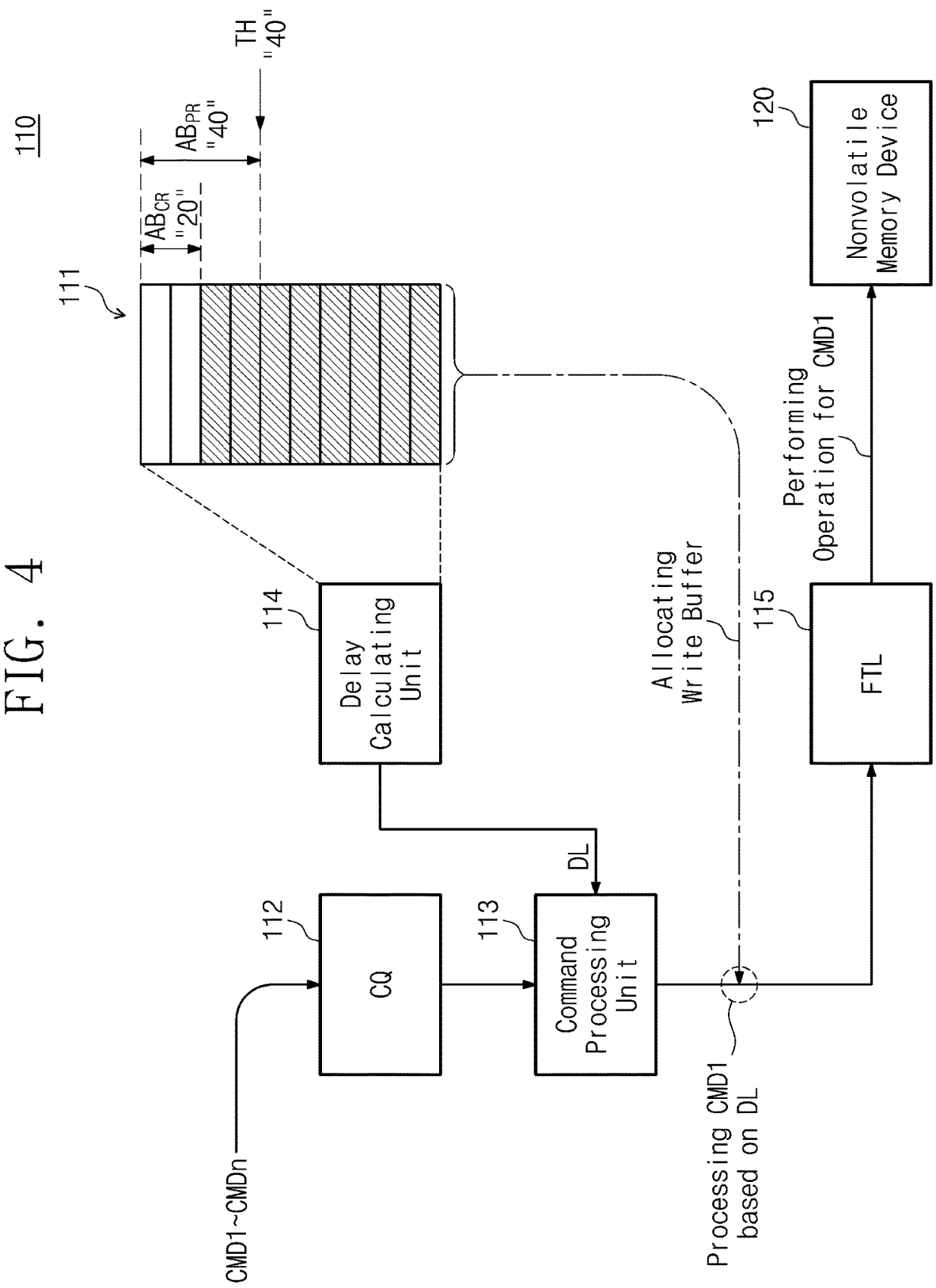
FIG. 4 is a view for describing an operation method of FIG. 3.

FIG. 4 is a view for describing an operation method of FIG. 3. To describe the technical idea of the exemplary embodiment easily, it is assumed that the resource pool 111 is implemented with a write buffer and the whole size of the write buffer is "100". Also, it is assumed that the reference value TH is "40", the currently available buffer $AB_{CR}$ is "20", and the previously available buffer $AB_{PR}$ is "40". That is, an operation of the case where the currently available buffer $AB_{CR}$ is smaller than the reference value TH will be described with reference to FIG. 4. In FIG. 4, a currently allocated write buffer (i.e., a write buffer being currently used) is shaded.

Referring to FIGS. 1, 3, and 4, a plurality of commands CMD1 to CMDn from the host 11 may be queued in the command queue 112. The command processing unit 113 may fetch a first command CMD1 of the plurality of commands CMD1 to CMDn queued in the command queue 112. In an exemplary embodiment, the first command CMD1 may be a command to be processed first, depending on a queuing manner of the command queue 112.

In this case, the delay calculating unit 114 may determine whether the size of the currently available buffer $AB_{CR}$ in the resource pool 111 is smaller than the reference value TH. As described above, since the currently available buffer $AB_{CR}$ is smaller than the reference value TH, the delay calculating unit 114 may calculate the delay time DL. In an exemplary embodiment, the delay calculating unit 114 may calculate the delay time DL based on the following Equation 1.

$$DL=[TH-AB_{CR}]*P+[(TH-AB_{CR})-(TH-AB_{PR})]*D \quad \text{[Equation 1]}$$

Referring to Equation 1, "DL" represents a calculated delay time, "$AB_{CR}$" represents the size of a currently available buffer of a current state, and "TH" represents a reference value associated with an available write buffer. "P" represents a first control parameter for converting a difference between the size of the currently available buffer and the reference value to a delay time, and "D" represents a second control parameter for converting a variation of an available buffer to the delay time.

As described above, the currently available buffer $AB_{CR}$ may represent the size of the available write buffer at a time when the first command CMD1 is fetched, and the size of the previously available buffer $AB_{PR}$ may represent the size of the available write buffer at a time when another command is fetched before the first command CMD1 (i.e., at a time when another command is fetched immediately before the first command CMD1).

Referring to the first term (i.e., "$[TH-AB_{CR}]*P$") of the right side of Equation 1, since the reference value TH is a preset value, the delay time DL may decrease as the currently available buffer $AB_{CR}$ increases, and the delay time DL may increase as the currently available buffer $AB_{CR}$ decreases. Referring to the second term (i.e., "$[(TH-AB_{CR})-(TH-AB_{PR})]*D$") of the right side of Equation 1, the delay time DL may increase as a difference between the previously available buffer $AB_{PR}$ and the currently available buffer $AB_{CR}$ increases. In other words, the delay time DL may decrease if the currently available buffer $AB_{CR}$ is greater than the previously available buffer $AB_{PR}$ and may increase if the currently available buffer $AB_{CR}$ is smaller than the previously available buffer $AB_{PR}$. That is, the delay calculating unit 114 according to the exemplary embodiment may calculate the delay time DL based on both the currently available buffer $AB_{CR}$ of the resource pool 111 and a variation of an available buffer (($TH-AB_{CR}$)-($TH-AB_{PR}$)).

The command processing unit 113 may process the first command CMD1 based on the delay time DL. For example, the command processing unit 113 may deferred-process the first command CMD1 based on the calculated delay time DL. In an exemplary embodiment, processing, at the command processing unit 113, the first command CMD1 may include allocating a write buffer from the resource pool 111 as illustrated by a dash line of FIG. 4. In other words, the command processing unit 113 may deferred-process the first command CMD1 by allocating a write buffer for the first command CMD1 after the delay time DL elapses.

Afterwards, the FTL 115 may perform an operation corresponding to the first command CMD1. For example, in the case where the first command CMD1 is a write command, the FTL 115 may store write data stored in the allocated write buffer in the nonvolatile memory device 120.

In an exemplary embodiment, the memory controller 110 may provide the host 11 with a response to the first command CMD1, e.g., transmitting the response to the first command CMD1, after the fetched first command CMD1 is processed but before an operation associated with the first command CMD1 is performed by the FTL 115. A time when the response to the first command CMD1 is provided may act as a delay or latency associated with the first command CMD1.

In an exemplary embodiment, the currently available buffer $AB_{CR}$, the previously available buffer $AB_{PR}$, and the reference value TH are specific values. However, the scope and spirit of the exemplary embodiment may not be limited thereto. For example, the currently available buffer $AB_{CR}$, the previously available buffer $AB_{PR}$, and the reference value TH may be calculated as a ratio to the whole of the resource pool 111.

As described above, in the case where the currently available buffer $AB_{CR}$ is smaller than the reference value TH, the memory controller 110 may calculate the delay time DL associated with the fetched first command CMD1 based on the currently available buffer $AB_{CR}$, the previously available buffer $AB_{PR}$, and the reference value TH and may process the fetched first command CMD1 based on the calculated delay time DL. In this case, an available write buffer may be secured in the resource pool 111 during the delay time DL, thereby preventing a sharp delay increase of the following specific commands.

Figure 5:
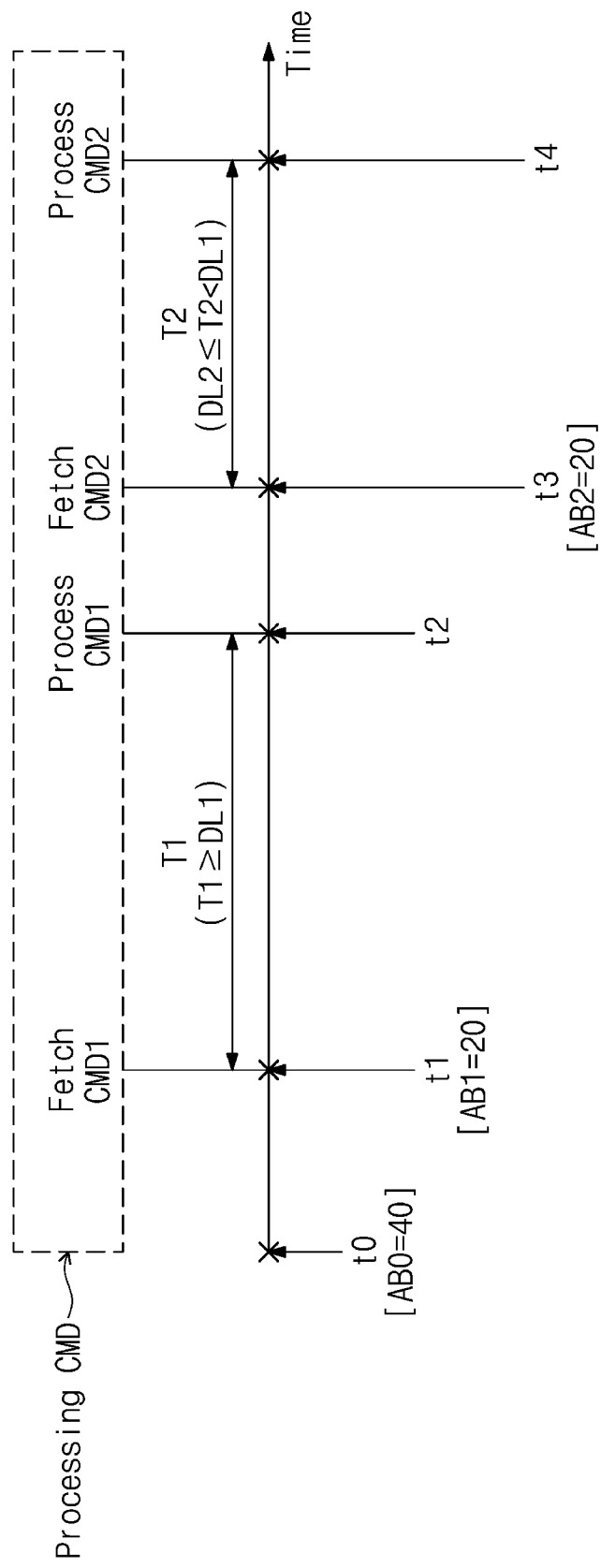
FIG. 5 is a timing diagram for describing an operation method of the memory controller of FIG. 4.

FIG. 5 is a timing diagram for describing an operation of the memory controller 110 of FIG. 4. For brevity of illustration and convenience of description, a process associated with first command CMD1 and second command CMD2 is illustrated in FIG. 5. Also, as in the above description, it is assumed that the reference value TH is "40". Also, the timing diagram of FIG. 5 is described on the basis of the memory controller 110. However, the scope and spirit of the exemplary embodiment may not be limited thereto. For example, operations according to the timing diagram of FIG. 5 may be performed by respective components included in the memory controller 110 or by the processor 116 (refer to FIG. 2) driving software.

Referring to FIGS. 4 and 5, at a first time point t1, (first time point), the memory controller 110 may fetch the first command CMD1. In an exemplary embodiment, the first command CMD1 may be one of a plurality of commands CMD1 to CMDn queued in the command queue 112.

At a 0-th time point t0 before the first time point t1, a 0-th available buffer AB0 may be "40". In an exemplary embodiment, the 0-th time point t0 may be a point in time when a command is fetched from the command queue 112 before the first command CMD1 (or immediately before the first command CMD1). At the first time point t1, a first available buffer AB1 may be "20".

With respect to the first time point t1, the 0-th available buffer AB0 may be a previously available buffer (i.e., $AB_{PR}$), and the first available buffer AB1 may be a currently available buffer (i.e., $AB_{CR}$). In the case, the currently available buffer may be smaller than the previously available buffer. In other words, the size of the write buffer used at the first time point t1 may be greater than that at the 0-th time point t0. This phenomenon may occur due to a maintenance operation of the FTL 115. For example, in the case where the FTL 115 performs a maintenance operation (e.g., a garbage collection operation), the FTL 115 may allocate (or use) a write buffer from the resource pool 111. That is, the size of a write buffer (or a used write buffer) allocated by the maintenance operation of the FTL 115 may increase.

As described above, since the first available buffer AB1 is smaller than the reference value TH, the memory controller 110 may calculate the delay time DL based on the available buffers AB0 and AB1 and the reference value TH. For example, referring to Equation 1 above described, with respect to the first time point t1, since the currently available buffer $AB_{CR}$ is the first available buffer AB1 and the previously available buffer $AB_{PR}$ is the first 0-th available buffer AB0, the currently available buffer $AB_{CR}$ and the previously available buffer $AB_{PR}$ may be "20" and "40", respectively. For convenience of description, assuming that each of the first and second control parameters "P" and "D" is, but is not limited to, "1", a first delay time DL1 calculated at the first time point t1 may correspond to a value of "40".

The memory controller 110 may deferred-process the first command CMD1 based on the first delay time DL1 corresponding to the value of "40". For example, the memory controller 110 may process the first command CMD1 at a second time point t2 when a first time T1 elapses from the first time point t1. In this case, the first time T1 may be longer than or equal to the first delay time DL1. That is, the memory controller 110 may process the first command CMD1 after the first delay time DL1 elapses, i.e., after the first delay time elapses or the delay time elapses. In other words, the memory controller 110 may delay processing of the first command CMD1 as much as at least the first delay time DL1.

Afterwards, the memory controller 110 may fetch the second command CMD2 at a third time point t3 and may calculate a second delay time DL2. At the third time point t3, a second available buffer AB2 may be "20". With respect to the third time point t3, the currently available buffer $AB_{CR}$ may be the second available buffer AB2, and the previously available buffer $AB_{PR}$ may be the first available buffer AB1. As in the above description, assuming that each of the first and second control parameters "P" and "D" is "1", the second delay time DL2 associated with the second command CMD2 may correspond to a value of "20".

The memory controller 110 may deferred-process the second command CMD2 based on the second delay time DL2 corresponding to the value of "20". For example, the memory controller 110 may process the second command CMD2 at a fourth time point t4 when a second time T2 elapses from the third time period t3. In this case, the second time T2 may be longer than or equal to the second delay time DL2 and may be shorter than the first delay time DL1. In other words, the memory controller 110 may delay processing of the second command CMD2 as much as at least the second delay time DL2.

That the first and second delay times DL1 and DL2 are different from each other is that the currently available buffers $AB_{CR}$ at the first and third time points t1 and t3 are the same but variations of available buffers are different. For example, a difference between the currently available buffer $AB_{CR}$ and the previously available buffer $AB_{PR}$ is "20" with respect to the first time point t1. In contrast, a difference between the currently available buffer $AB_{CR}$ and the previously available buffer $AB_{PR}$ is "0" with respect to the second time point t2. This means that an available buffer decreases at the first time point t1 (or the amount of used buffer, e.g., first amount, increases) and does not decrease at the second time point t2. In an exemplary embodiment, that an available buffer decreases may mean that a write buffer of the resource pool 111 is allocated (or used) for a maintenance operation of the FTL 115.

In other words, since there is a decreasing tendency of the size of an available buffer at the first time point t1, the available buffer may be secured by increasing a delay time associated with the first command CMD1. Since the size of the available buffer does not decrease at the third time point t3, even though a delay time of the second time point t2 is shorter than a delay time of the first time point t1, the available buffer may be secured.

As described above, the memory controller 110 according to the exemplary embodiment may calculate a delay time associated with a command based on both the size of a currently available buffer of the resource pool 111 and a variation of an available buffer of the resource pool 111, thereby preventing a sharp delay of a command under a specific condition.

Although not illustrated in FIG. 5, in an exemplary embodiment, if the calculated delay time DL is smaller than a specific value, the memory controller 110 may normal-process a fetched command. For example, the calculated delay time DL may have a negative (−) value. In this case, if a write buffer needed to process a command is sufficient, the memory controller 110 may process the command without a delay time or based on a preset delay time.

As a more detailed example, assuming that the currently available buffer $AB_{CR}$ is "30" and the previously available buffer $AB_{PR}$ is "10" (assumed that the first and second control parameters "P" and "D" are "1"), the delay time DL may correspond to a value of "−10" (i.e., a negative value) depending on Equation 1. This means that there is an increasing tendency of a variation of an available buffer. In other words, this means that, since a buffer release rate is faster than a buffer allocation rate, an available write buffer is secured quickly afterwards. Accordingly, in the case where the delay time DL corresponds to a negative (−) value, even though the memory controller 110 processes a command without a delay time or based on a preset delay time, a sufficient write buffer may be secured upon processing a command(s) later.

Exemplary embodiments are described as the previously available buffer $AB_{PR}$ is the size of the available buffer with respect to any one time point. However, the scope and spirit of the exemplary embodiments may not be limited thereto. For example, the previously available buffer $AB_{PR}$ may be an average value of available buffers included in a specific range. For example, the previously available buffer $AB_{PR}$ may be an average value of available buffers sensed from a specific time point (e.g., a previous time point) to a current time point.

In an exemplary embodiment, the delay calculating unit 114 calculates the delay time DL based on the currently available buffer $AB_{CR}$, the previously available buffer $AB_{PR}$, and the reference value TH are specific values. However, the scope and spirit of the exemplary embodiment may not be limited thereto. For example, the delay calculating unit 114 may calculate the delay time DL based on the size of a currently allocated (or used) buffer, the size of a previously allocated (or used) buffer, and a reference value (in this case, the reference value is a reference value associated with an allocated (or used) buffer). In this case, a delay time may be calculated by the following Equation 2.

$$DL=[UB_{CR}-TH']*P+[(UB_{CR}-TH')-(UB_{PR}-TH')]*D \quad \text{[Equation 2]}$$

Referring to Equation 2, "$UB_{CR}$" represents the size of a currently allocated (or used) buffer, "$UB_{PR}$" represents the size of a previously allocated (or used) buffer, and "TH'" represents a reference value associated with an allocated (or used) buffer. Other parameters are described with reference to Equation 1, and thus, a detailed description thereof will not be repeated here. According to Equation 2, the delay calculating unit 114 may calculate the delay time DL based on the size of a write buffer allocated and a variation of a write buffer allocated.

In an exemplary embodiment, although not illustrated in FIG. 5, a value of accumulating a value of the reference value TH minus the currently available buffer $AB_{CR}$ may be applied to the delay time DL. For example, a value "[TH−$AB_{CR}$]" (i.e., a difference between the reference value TH and the currently available buffer $AB_{CR}$) of the first term of Equation 1 may be accumulated. The accumulated value may be applied to the delay time DL. For example, the delay time DL may be calculated by the following Equation 3.

$$DL=[TH-AB_{CR}]*P+[(TH-AB_{CR})-(TH-AB_{PR})]*D+\Sigma(TH-AB)*I \quad \text{[Equation 3]}$$

In Equation 3, "AB" represents the size of an available buffer detected previous time points, and "I" represents a control parameter for converting an accumulated value to a delay time. Other parameters are described with reference to Equation 1, and thus, a detailed description thereof will not be repeated here. That is, the third term of Equation 3 represents an accumulated value of a difference between the reference value TH and the currently available buffer $AB_{CR}$.

In a specific situation (e.g., a situation where the currently available buffer $AB_{CR}$ is "0" and the previously available buffer $AB_{PR}$ is "0" or a situation where the currently available buffer $AB_{CR}$ and the previously available buffer $AB_{PR}$ are the same), a value of the second term ([(TH−$AB_{CR}$)−(TH−$AB_{PR}$)]*D) of Equation 3 may be "0". In this case, a variation of an available write buffer may not be applied to the delay time DL. For this reason, referring to the third term of Equation 3, an accumulated value of a difference between the reference value TH and the currently available buffer $AB_{CR}$ may be applied to the delay time DL. Accordingly, as a command is processed based on the delay time DL, an available write buffer may be sufficiently secured, thereby preventing a sharp increase in a delay associated with a command. The above-described ways to calculate the delay time DL may be variously changed or modified without departing from the technical idea of the exemplary embodiment.

Figure 6:
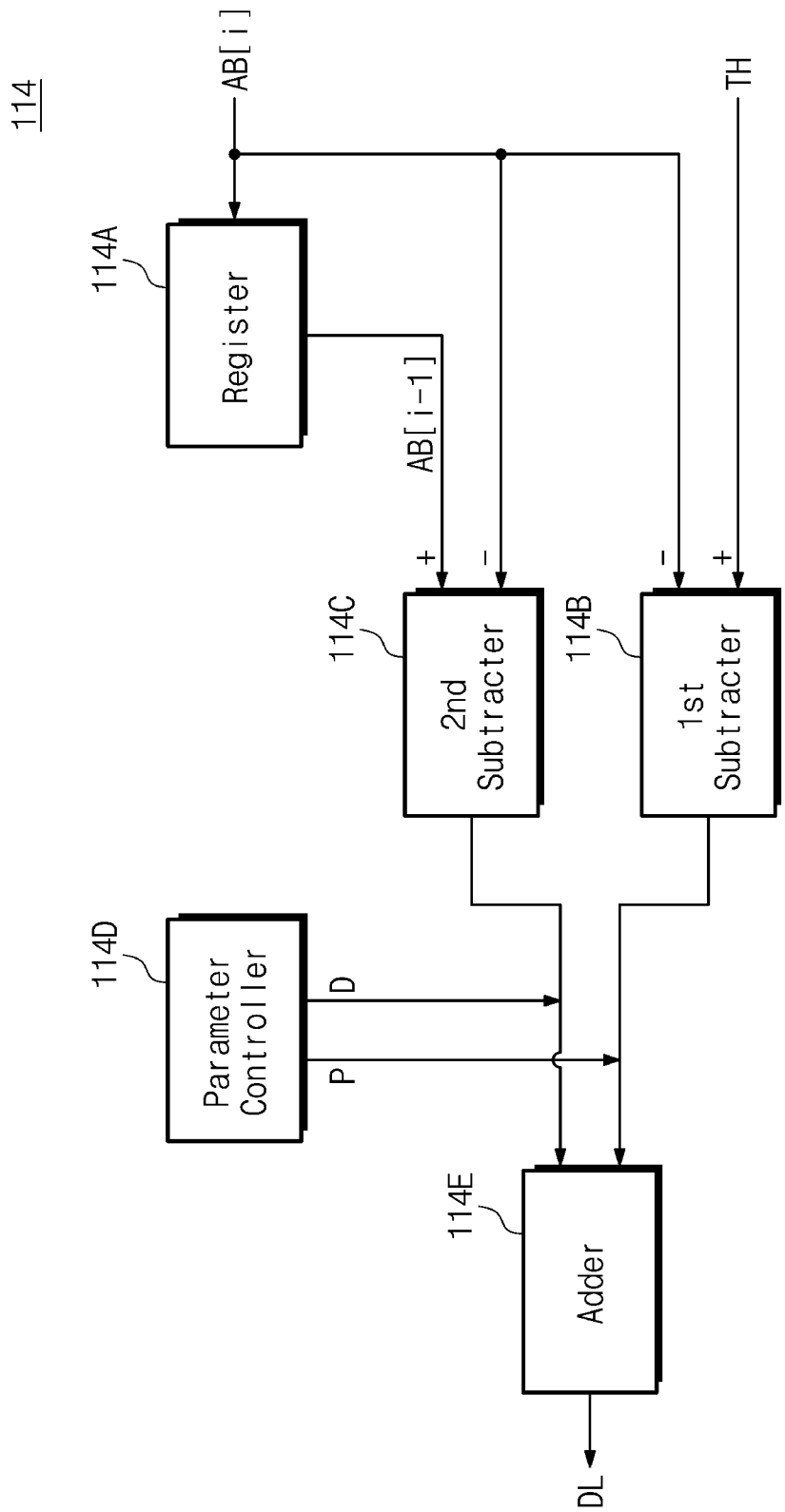
FIG. 6 is a block diagram illustrating a delay calculating unit of FIG. 4.

FIG. 6 is a block diagram illustrating the delay calculating unit 114 of FIG. 4. Referring to FIGS. 4 and 6, the delay calculating unit 114 may include a register 114A, a first subtractor 114B, a second subtractor 114C, a parameter controller 114D, and an adder 114E.

The register 114A may receive information about a currently available buffer AB[i]. The register 114A may store information about the received currently available buffer AB[i] and information about a previously available buffer AB[i−1]. In an exemplary embodiment, the previously available buffer AB[i−1] may be an available buffer at a specific time point or an average value of available buffers in a specific interval.

The first subtractor 114B may be configured to calculate and output a difference between the currently available buffer AB[i] and the reference value TH. For example, the first subtractor 114B may output a value of the reference value TH minus the currently available buffer AB[i]. In an exemplary embodiment, a value output from the first subtractor 114B may be a value corresponding to the first term of the right side of Equation 1.

The second subtractor 114C may be configured to receive the previously available buffer AB[i−1] from the register 114A and to calculate and output a difference between the currently available buffer AB[i] and the previously available buffer AB[i−1]. For example, the second subtractor 114C may output a value of the previously available buffer AB[i−1] minus the currently available buffer AB[i]. In an exemplary embodiment, a value output from the second subtractor 114C may be a value corresponding to the second term of the right side of Equation 1.

The parameter controller 114D may be configured to control the first and second parameters "P" and "D". A described with reference to Equation 1, the first control parameter "P" represents a control parameter for converting a difference between the size of a currently available buffer and a reference value to a delay time, and the second control parameter "D" represents a control parameter for converting a variation of an available buffer to the delay time. The parameter controller 114D may control the first and second parameters "P" and "D".

In an exemplary embodiment, the second control parameter "D" may be differently set according to points in time to sense the currently available buffer AB [i] and the previously available buffer AB[i−1]. For example, a value of the control parameter "D" may decrease as a time difference between the point in time to sense the currently available buffer AB[i] and the point in time to sense the previously available buffer AB[i−1] becomes greater.

The first and second control parameters "P" and "D" from the parameter controller 114D are respectively combined with output values of the first subtractor 114B and second subtractor 114C, and the combined results may be provided to the adder 114E. The adder 114E may add the input values to output the delay time DL.

In an exemplary embodiment, the delay calculating unit 114 illustrated in FIG. 6 is an example for describing a configuration to calculate the delay time DL, and the scope and spirit of the exemplary embodiment is not limited thereto.

Respective components included in the delay calculating unit 114 may be implemented in the form of hardware. Alternatively, respective components included in the delay calculating unit 114 may be implemented in the form of software and may be driven by the processor 116 (refer to FIG. 2) of the memory controller 110 or by a separate device.

Figure 7:
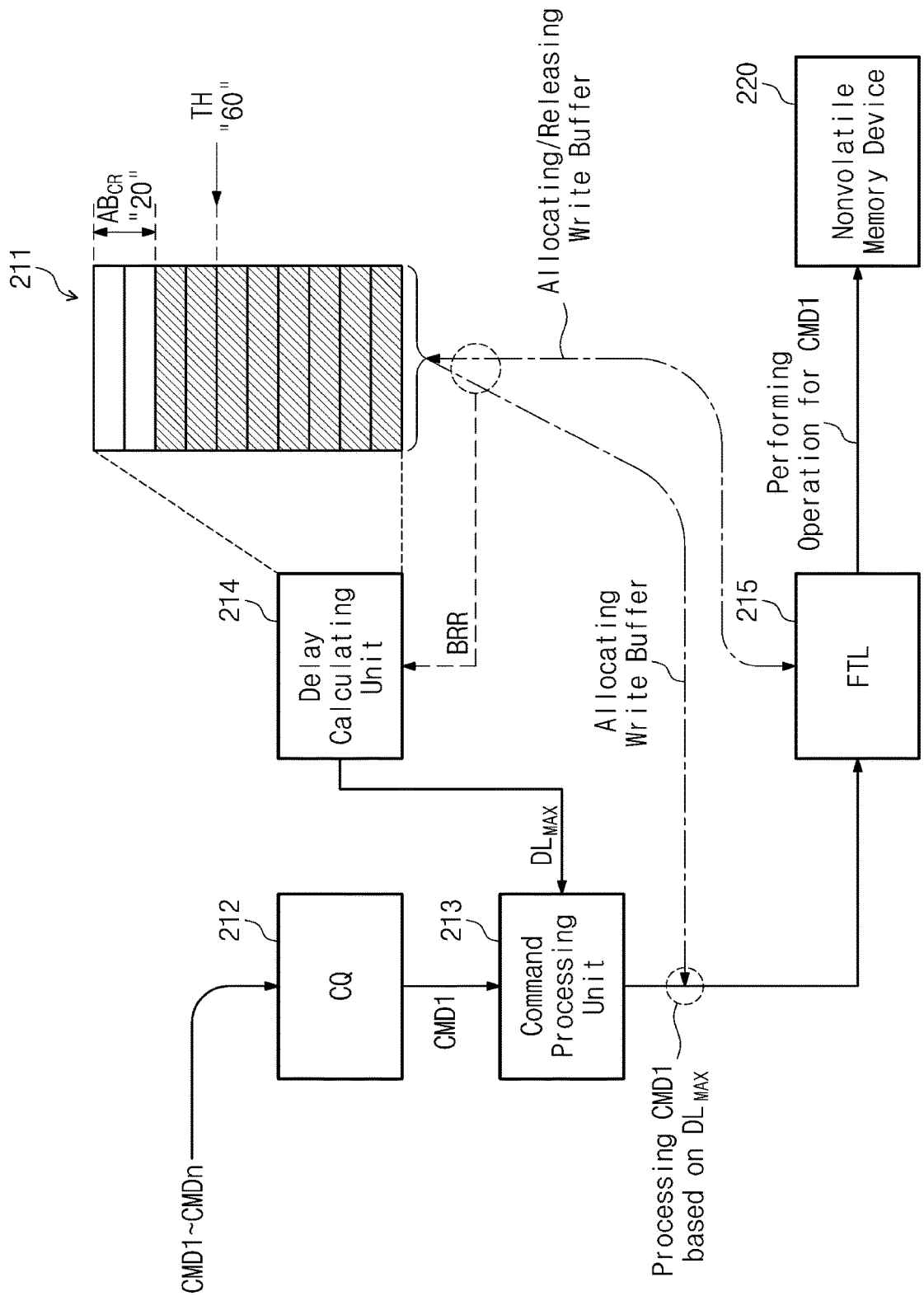
FIG. 7 is a block diagram for describing an operation of the memory controller according to an exemplary embodiment.
Figure 8:
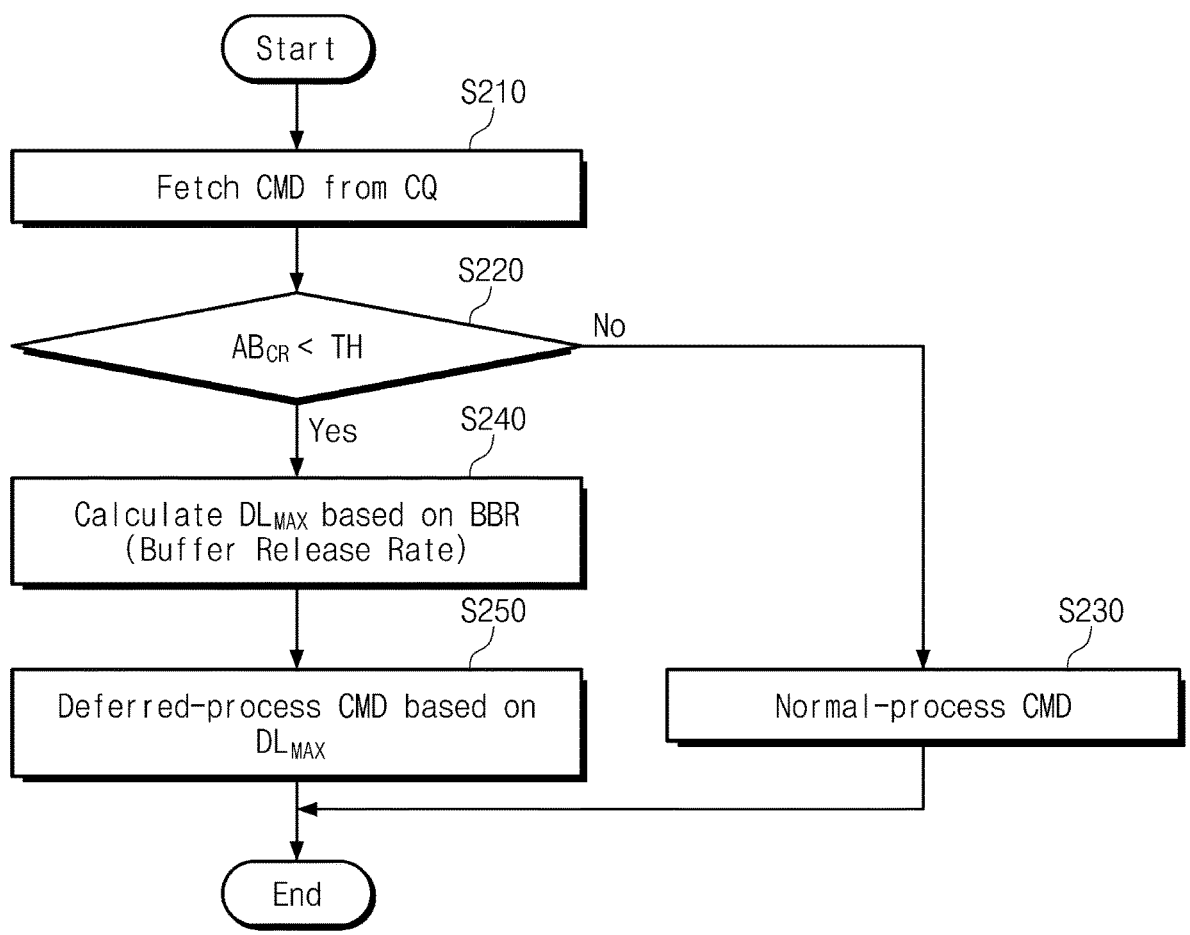
FIG. 8 is a flowchart for describing an operation of the memory controller according to an exemplary embodiment.

FIG. 7 is a block diagram for describing an operation of a memory controller 210 according to an exemplary embodiment, and FIG. 8 is a flowchart for describing an operation of the memory controller 210 according to an exemplary embodiment. Unnecessary components are omitted in FIG. 7 to describe an exemplary embodiment clearly. Also, components described with reference to FIGS. 1 to 6 are marked by similar reference numerals in FIGS. 7 to 8, and a detailed description thereof will not be repeated here.

Referring to FIGS. 7 and 8, the memory controller 210 may perform operation S210 and operation S230. Operation S210 to operation S230 are similar to operation S110 to operation S130 of FIG. 3, and thus, a detailed description thereof will not be repeated here.

If the currently available buffer $AB_{CR}$ is smaller than the reference value TH, in operation S240, the memory controller 210 may calculate a maximum delay time $DL_{MAX}$ based on a buffer release rate BRR.

For example, as illustrated in FIG. 7, resources of a resource pool 211 may be allocated (or used) and may be released (or returned) by a maintenance operation of an FTL 215 in addition to a command processing operation. In this case, a delay calculating unit 214 may sense the buffer release rate BRR. The buffer release rate BRR may represent a size difference between a resource (e.g., a write buffer) released per time and a resource allocated per time. That is, in the case where a write buffer of "30" is allocated per unit time, e.g., a second amount of write buffer allocated per unit time, and a write buffer of "50" is released per unit time, e.g., first amount of write buffer released per unit time, the buffer release rate BRR may correspond to a value of "20". In contrast, in the case where a write buffer of "30" is allocated per unit time and a write buffer of "20" is released per unit time, the buffer release rate BRR may correspond to a value of "−10". That is, an available write buffer may be secured more quickly as the buffer release rate BRR becomes higher.

The delay calculating unit 214 may calculate the maximum delay time $DL_{MAX}$ based on the sensed buffer release rate BRR. For example, an available write buffer may be secured more quickly as the buffer release rate BRR becomes higher. That is, a sufficient available buffer may be secured even though a delay time associated with a command is short.

In an exemplary embodiment, the buffer release rate BRR according to the maintenance operation of the FTL 215 may have an influence on performance of a storage device. That is, in the case where a delay time associated with a command is longer than the maximum delay time $DL_{MAX}$, reduction in performance may occur due to a delay associated with command processing. Accordingly, the delay calculating unit 214 may calculate the maximum delay time $DL_{MAX}$ based on the buffer release rate BRR such that the reduction in performance of the storage device is minimized and a sufficient available buffer is secured. For example, the delay calculating unit 214 may decrease the maximum delay time $DL_{MAX}$ as the buffer release rate BRR increases and may increase the maximum delay time $DL_{MAX}$ as the buffer release rate BRR decreases.

In an exemplary embodiment, the maximum delay time $DL_{MAX}$ based on the buffer release rate BRR may be calculated by a separate calculation circuit or calculation software or may be selected in a predetermined table (PDT) manner.

After the maximum delay time $DL_{MAX}$ is calculated, in operation S250, the memory controller 210 may process a command CMD based on the maximum delay time $DL_{MAX}$. For example, as illustrated in FIG. 7, a command processing unit 213 may process a first command CMD1 fetched from a command queue 212 based on the maximum delay time $DL_{MAX}$.

In this case, unlike the exemplary embodiment described with reference to FIGS. 1 to 8, the command processing unit 213 may process the fetched first command CMD1 within the maximum delay time $DL_{MAX}$, i.e., before the maximum delay time elapses. The reason is that, if a delay time associated with the first command CMD1 exceeds the maximum delay time $DL_{MAX}$, the whole performance of a storage device is reduced. Accordingly, the command processing unit 213 may process the first command CMD1 within the maximum delay time $DL_{MAX}$.

Figure 9:
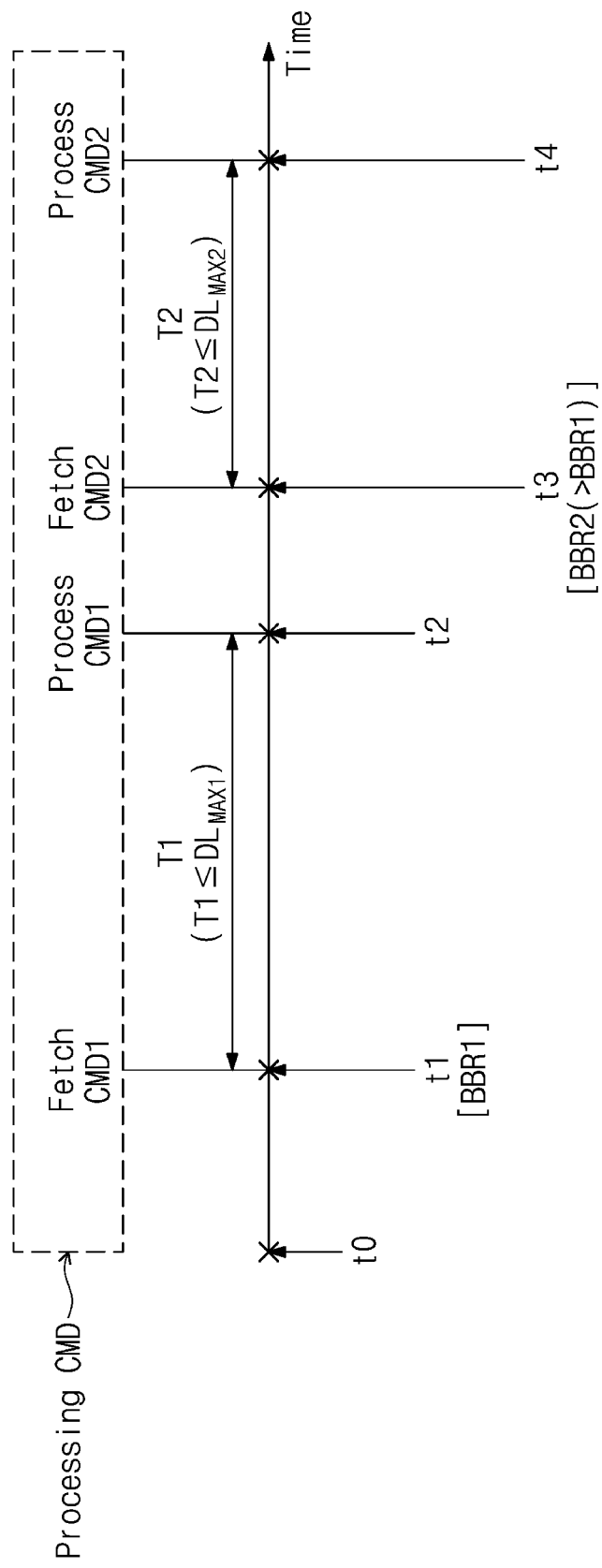
FIG. 9 is a timing diagram for describing an operation of the memory controller of FIG. 7.

FIG. 9 is a timing diagram for describing an operation of the memory controller 210 of FIG. 7. To describe the technical idea of the exemplary embodiment clearly, processing of first command CMD1 and second command CMD2 is illustrated in FIG. 9, and it is assumed that an available buffer $AB_{CR}$ is smaller than the reference value TH at a point in time when the first command CMD1 and second command CMD2 are fetched.

Also, the timing diagram of FIG. 9 will be described on the basis of an operation of the memory controller 210. However, operations illustrated in FIG. 9 may be performed by respective components included in the memory controller 210. However, the above-described configurations may be only an example, and the scope and spirit of the exemplary embodiment may not be limited thereto.

Referring to FIGS. 7 and 9, at a first time point t1, the memory controller 210 may fetch the first command CMD1. At the first time point t1, a buffer release rate may be a first buffer release rate BRR1. As described above, the memory controller 210 (in particular, the delay calculating unit 214) may sense the first buffer release rate BRR1 and may calculate a first maximum delay time $DL_{MAX1}$ based on the sensed first buffer release rate BRR1.

The memory controller 210 may process the first command CMD1 based on the first maximum delay time $DL_{MAX1}$ calculated. For example, the memory controller 210 may process the first command CMD1 at a second time point t2 when a first time T1 elapses from the first time point t1. In this case, the first time T1 may be shorter than or equal to the first maximum delay time $DL_{MAX1}$.

At a third time point t3, the memory controller 210 may fetch a second command CMD2. At the third time point t3, a buffer release rate may be a second buffer release rate BRR2. In this case, the second buffer release rate BRR2 may be faster than the first buffer release rate BRR1. In other words, the size of a write buffer returned per unit time at the second time point t2 may be greater than the size of a write buffer returned per unit time at the first time point t1. The memory controller 210 (in particular, the delay calculating unit 214) may sense the second buffer release rate BRR2 and may calculate a second maximum delay time $DL_{MAX2}$ based on the sensed second buffer release rate BRR2. In this case, the second maximum delay time $DL_{MAX2}$ may be shorter than the first maximum delay time $DL_{MAX1}$. This is described with reference to FIGS. 7 and 8, and thus, a detailed description thereof will not be repeated here.

The memory controller 210 may process the second command CMD2 at a fourth time point t4 when a second time T2 elapses from the third time point t3. In this case, the second time T2 may be shorter than or equal to the second maximum delay time $DL_{MAX2}$.

As described above, the memory controller 210 may calculate the maximum delay time $DL_{MAX}$ based on the buffer release rate BRR and may process a command based on the calculated maximum delay time $DL_{MAX}$, thereby preventing the reduction in performance of the storage device.

Figure 10:
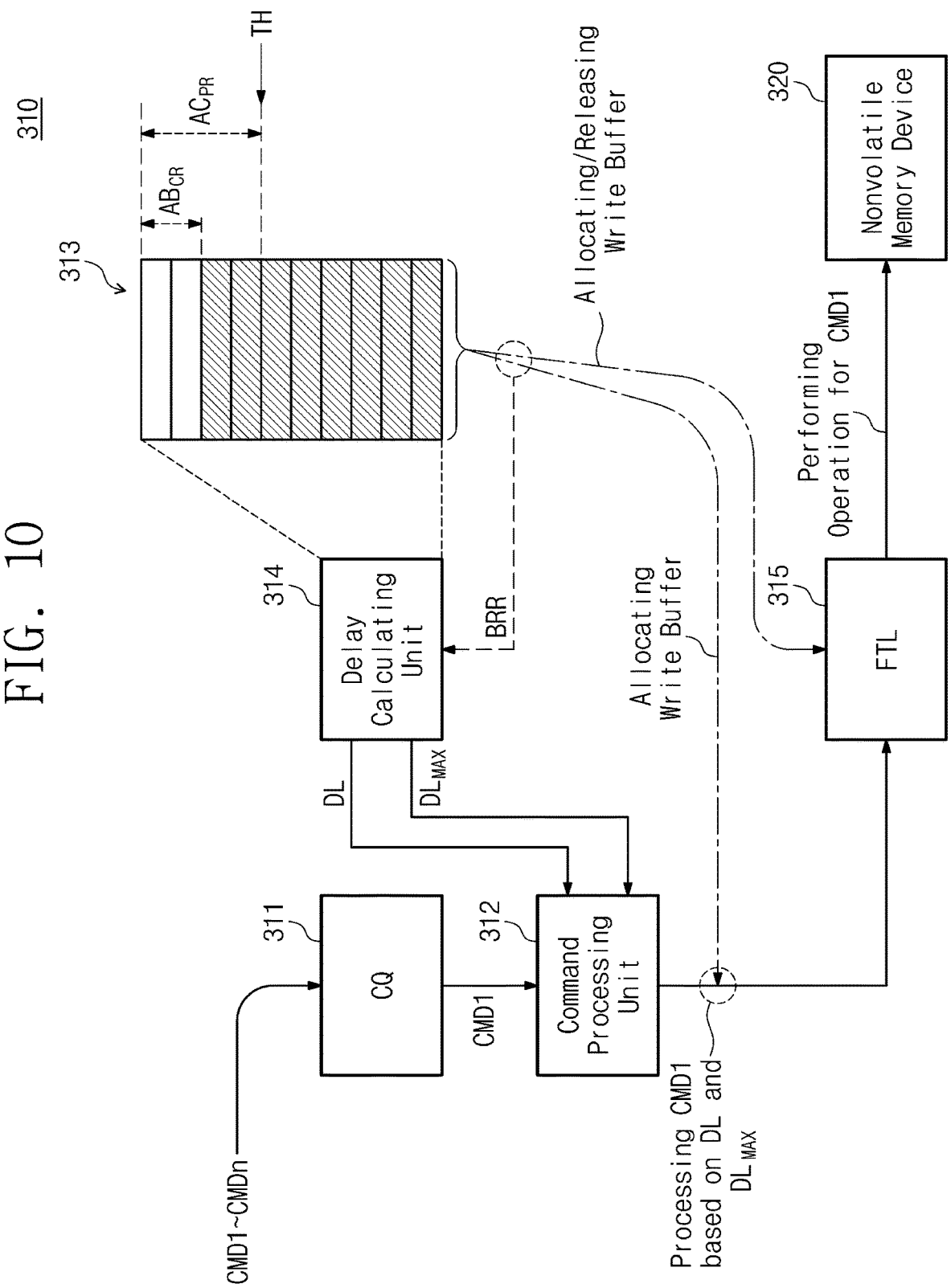
FIG. 10 is a block diagram for describing an operation of the memory controller according to an exemplary embodiment.
Figure 11:
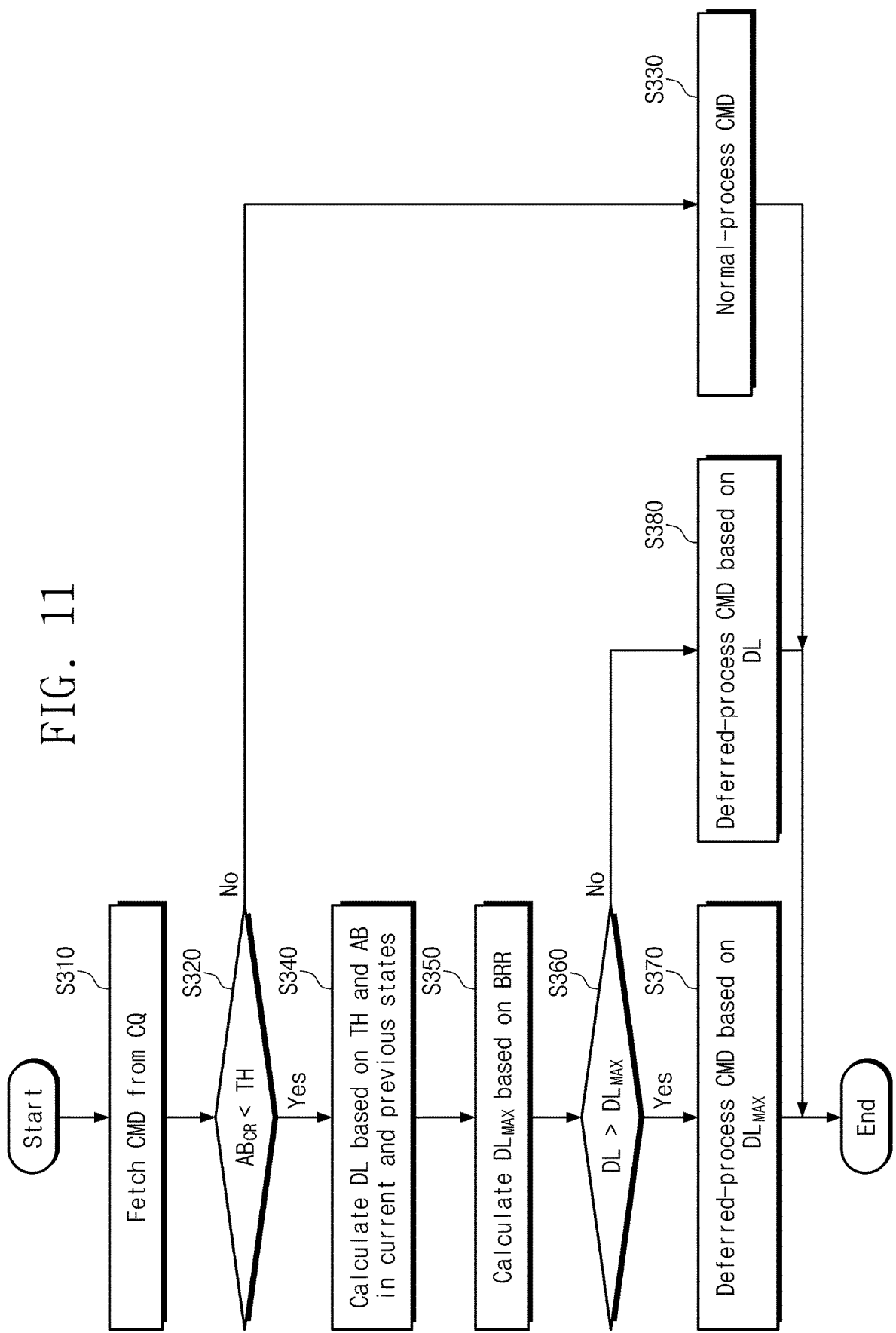
FIG. 11 is a flowchart for describing an operation of the memory controller according to an exemplary embodiment.

FIG. 10 is a block diagram for describing an operation of a memory controller 310 according to an exemplary embodiment, and FIG. 11 is a flowchart for describing an operation of the memory controller 310 according to an exemplary embodiment. Unnecessary components are omitted in FIG. 10 to describe an exemplary embodiment clearly. Also, components described with reference to FIGS. 1 to 9 are marked by similar reference numerals in FIGS. 10 to 11, and a detailed description thereof will not be repeated here.

Referring to FIGS. 10 and 11, the memory controller 310 may perform operation S310 and operation S330. Operation S310 to operation S330 may be similar to operation S110 to operation S130 of FIG. 3, and thus, a detailed description thereof will not be repeated here.

If the size of available buffer $AB_{CR}$ is smaller than a reference value TH, the memory controller 310 may perform operation S340 and operation S350. Operation S340 is similar to operation S130 of FIG. 3 and thus, a detailed description thereof will not be repeated here. Also, operation S350 is similar to operation S240 of FIG. 8, and thus, a detailed description thereof will not be repeated here.

In operation S360, the memory controller 310 may determine whether the calculated delay time DL is greater than the calculated maximum delay time $DL_{MAX}$. For example, as illustrated in FIG. 10, a delay calculating unit 314 may calculate the delay time DL based on the currently available buffer $AB_{CR}$, the previously available buffer $AB_{PR}$, and the reference value TH. The delay calculating unit 314 may calculate the maximum delay time $DL_{MAX}$ based on the buffer release rate BRR. The delay time DL and the maximum delay time $DL_{MAX}$ are described with reference to FIGS. 1 to 9, and thus, a detailed description thereof will not be repeated here.

The memory controller 310 may process the first command CMD1 based on the delay time DL and the maximum delay time $DL_{MAX}$. For example, if the delay time DL is greater than the maximum delay time $DL_{MAX}$, in operation S370, the memory controller 310 may deferred-process a command CMD based on the maximum delay time $DL_{MAX}$. For example, as described above, the maximum delay time $DL_{MAX}$ may represent a delay time causing the reduction in performance of a storage device. That is, in the case where the delay time DL is greater than the maximum delay time $DL_{MAX}$, to prevent the reduction in performance of the storage device, the memory controller 310 may process the first command CMD1 fetched from a command queue 312 within the maximum delay time $DL_{MAX}$. Accordingly, the reduction in performance of the storage device may be prevented.

If the delay time DL is not greater than the maximum delay time $DL_{MAX}$, in operation S380, the memory controller 310 may deferred-process a command based on the delay time DL. For example, as described above, the delay time DL may be a time to which a currently available buffer and a variation of an available buffer are applied. Accordingly, as the memory controller 310 deferred-processes a command based on the delay time DL, an available write buffer may be secured, thereby preventing a sharp increase in a delay associated with commands later. In an exemplary embodiment, in operation S380, an actual delay time associated with a command may be longer than or equal to the calculated delay time DL and may be shorter than the maximum delay time $DL_{MAX}$. That is, the memory controller 310 may make an actual delay time associated with a command shorter than the maximum delay time $DL_{MAX}$, thereby preventing the reduction in performance of the storage device. Also, the memory controller 310 may make the actual delay time associated with the command longer than the delay time DL, thus securing an available write buffer. Accordingly, it may be possible to prevent the reduction in performance of the storage device and a sharp delay of a command under a specific condition.

Figure 12:
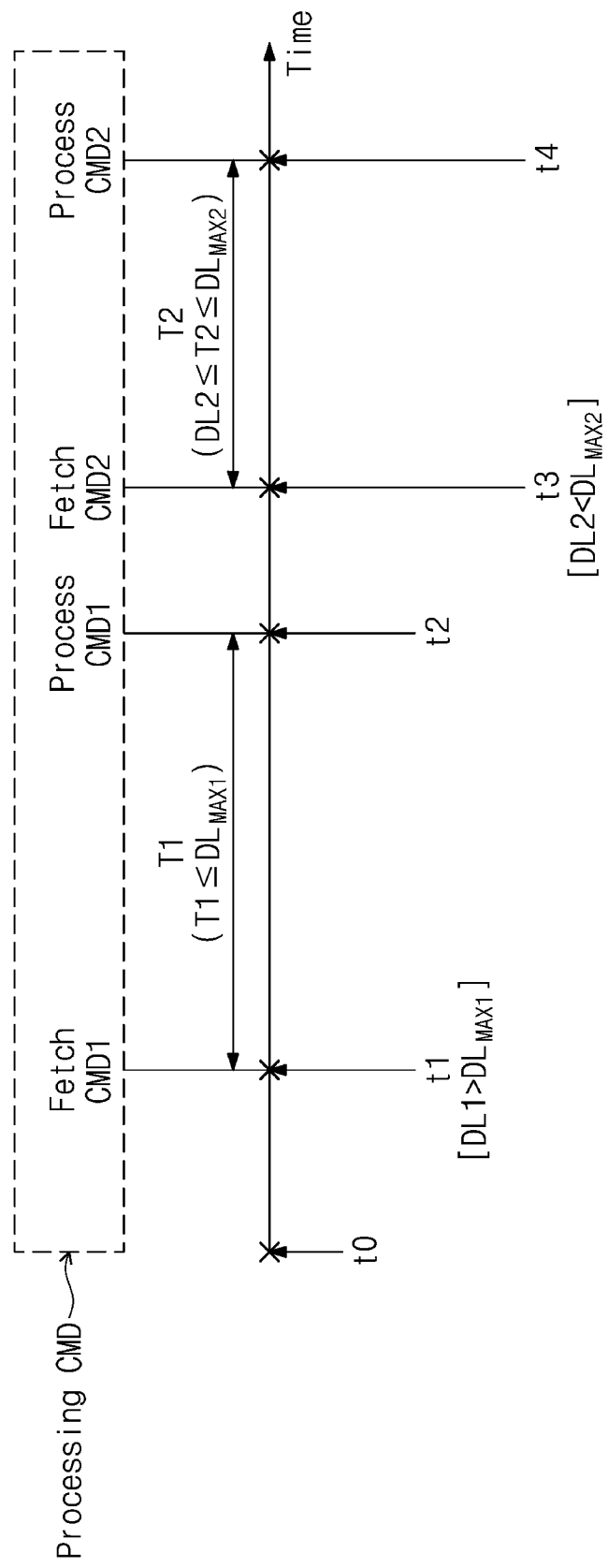
FIG. 12 is a timing diagram for describing an operation of the memory controller of FIG. 10.

FIG. 12 is a timing diagram for describing an operation of the memory controller 310 of FIG. 10. For brevity of illustration, an operation associated with first command CMD1 and second command CMD2 is illustrated in FIG. 12. Also, the timing diagram of FIG. 12 will be described on the basis of an operation of the memory controller 310. However, operations illustrated in FIG. 12 may be performed by respective components included in the memory controller 310. However, the above-described configurations may be only an example, and the scope and spirit of the exemplary embodiment may not be limited thereto.

Referring to FIGS. 10 and 12, the memory controller 310 may fetch a first command CMD1 at a first time point t1. In this case, the memory controller 310 may calculate a first delay time DL1 based on the currently available buffer $AB_{CR}$, the previously available buffer $AB_{PR}$, and the reference value TH and may calculate a first maximum delay time $DL_{MAX}$ based on the buffer release rate BRR.

The memory controller 310 may process the first command CMD1 at a second time point t2 when a first time T1 elapses from the first time point t1. Assuming that the first delay time DL1 is longer than the first maximum delay time $DL_{MAX1}$, the first time T1 may be shorter than or equal to the first maximum delay time $DL_{MAX1}$. That is, as described above, if the first delay time DL1 is longer than the first maximum delay time $DL_{MAX1}$, the memory controller 310 may deferred-process the first command CMD1 as much as the first time T1 shorter than or equal to the first maximum delay time $DL_{MAX1}$, thereby preventing the reduction in performance of a storage device.

Afterwards, the memory controller 310 may fetch a second command CMD2 at a third time point t3. In this case, the memory controller 310 may calculate a second delay time DL2 based on the currently available buffer $AB_{CR}$, the previously available buffer $AB_{PR}$, and the reference value TH and may calculate a second maximum delay time $DL_{MAX2}$ based on the buffer release rate BRR.

The memory controller 310 may process the second command CMD2 at a fourth time point t4 when a second time T2 elapses from the third time point t3. Assuming that the second delay time DL2 is shorter than the second maximum delay time $DL_{MAX2}$, the second time T2 may be longer than or equal to the second delay time DL2 and may be shorter than or equal to the second maximum delay time $DL_{MAX2}$. That is, as described above, in the case where the second delay time DL2 is shorter than the second maximum delay time $DL_{MAX2}$, the memory controller 310 may deferred-process the first command CMD1 as much as the second time T2, thereby preventing the reduction in performance of the storage device and securing an available write buffer. Accordingly, it may be possible to prevent the reduction in performance of the storage device and a sharp delay of a command under a specific condition.

Figure 13:
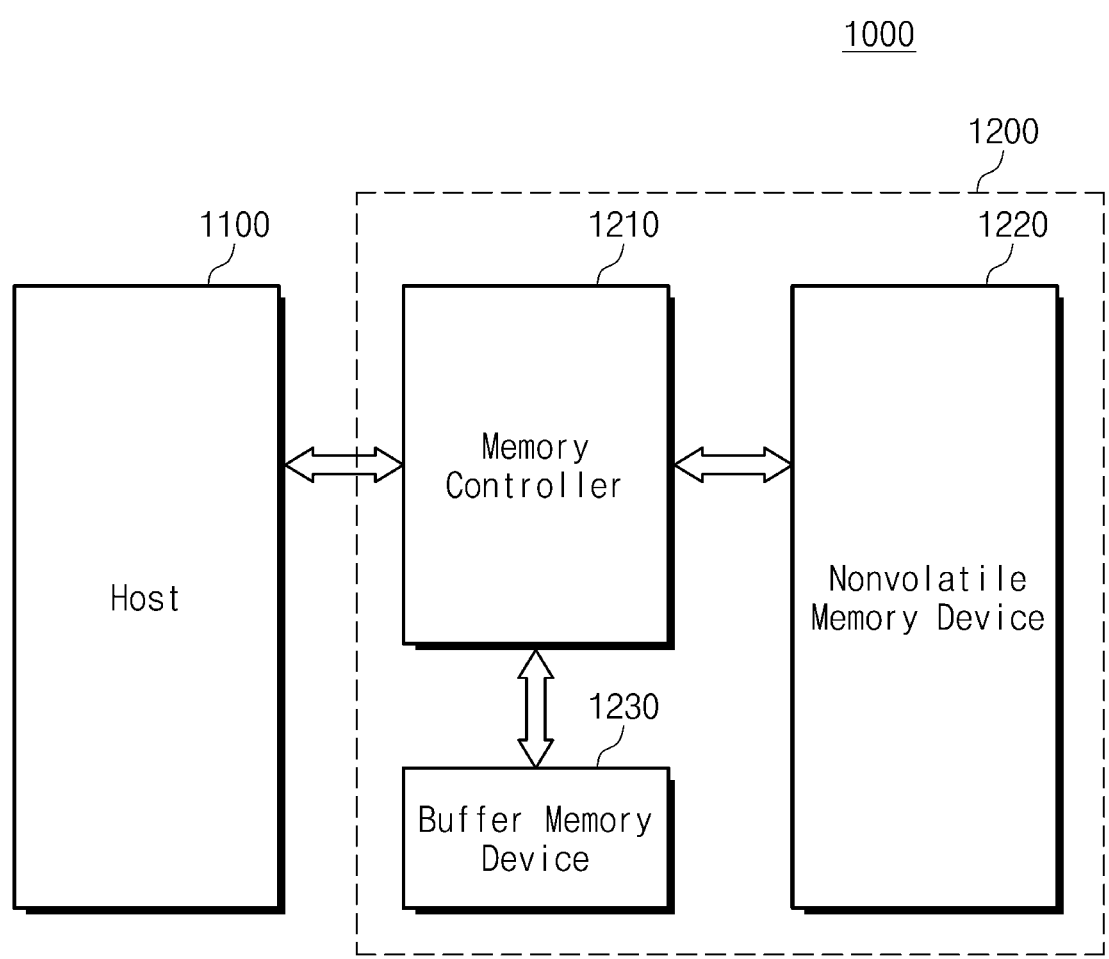
FIG. 13 is a block diagram illustrating the computing system according to an exemplary embodiment.

FIG. 13 is a block diagram illustrating a computing system according to an exemplary embodiment. Referring to FIG. 13, a computing system 1000 may include a host 1100 and a storage device 1200. The host 1100 and the storage device 1200 are described with reference to FIG. 1, and thus, a detailed description thereof will not be repeated here.

The storage device 1200 may include a memory controller 1210, a nonvolatile memory device 1220, and a buffer memory device 1230. The memory controller 1210 and the nonvolatile memory device 1220 are described above, and thus, a detailed description thereof will not be repeated here.

The buffer memory device 1230 may be used as a working memory, a cache memory, a buffer memory, etc. of the storage device 1200. In an exemplary embodiment, the buffer memory device 1230 may be managed by a resource pool described with reference to FIGS. 1 to 12. For example, the buffer memory device 1230 may be allocated as a write buffer or a read buffer, and such allocation may be managed by the resource pool.

As described with reference to FIGS. 1 to 12, the memory controller 1210 may monitor information about an available buffer, an allocated buffer, or a released buffer in the buffer memory device 1230 and may calculate the delay time DL or the maximum delay time $DL_{MAX}$ through the monitored information. The memory controller 1210 may selectively deferred-process a command from the host 1100 based on the calculated delay time DL and the calculated maximum delay time $DL_{MAX}$.

Figure 14:
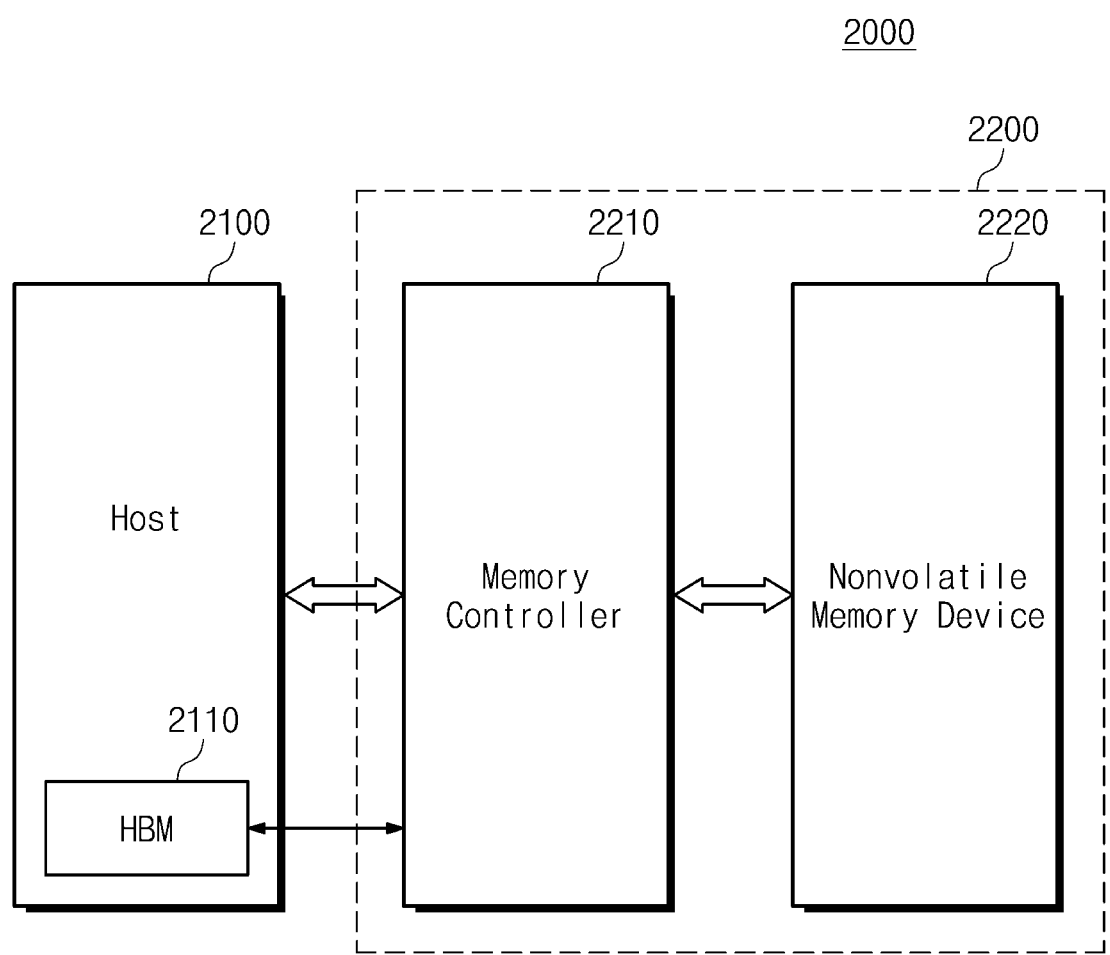
FIG. 14 is a block diagram illustrating the computing system according to an exemplary embodiment.

FIG. 14 is a block diagram illustrating a computing system according to an exemplary embodiment. Referring to FIG. 14, a computing system 2000 may include a host 2100 and a storage device 2200. The storage device 2200 may include a memory controller 2210 and a nonvolatile memory device 2220. The host 2100, the storage device 2200, the memory controller 2210, and the nonvolatile memory device 2220 are described above, and thus, a detailed description thereof will not be repeated here.

The host 2100 may include a host buffer memory (HBM) 2110. The memory controller 2210 may use the host buffer memory 2110 of the host 2100. For example, the memory controller 2210 may use the host buffer memory 2110 as a write buffer or a read buffer. Alternatively, the memory controller 2210 may store a variety of information used during an operation in the host buffer memory 2110. In an exemplary embodiment, the host buffer memory 2110 may be managed by a resource pool (not illustrated) included in the memory controller 2210. That is, the memory controller 2210 may use the host buffer memory 2110 of the host 2100 for the purpose of processing a command from the host 2100.

In an exemplary embodiment, although not illustrated in FIG. 14, the host 2100 may include a resource pool, a command queue, a command processing unit, a delay processing unit, or an FTL described with reference to FIGS. 1 to 12. That is, the host 2100 may be configured to selectively deferred-process a command based on an operation method described with reference to FIGS. 1 to 12.

In an exemplary embodiment, configurations usable in a resource pool of a memory controller according to the exemplary embodiment are described with reference to FIGS. 13 and 14. However, the scope and spirit of the exemplary embodiment may not be limited thereto. For example, the resource pool may include or manage various buffer memories or may include or manage a software resource, a hardware resource, or a combination thereof, which is used to process commands.

Figure 15:
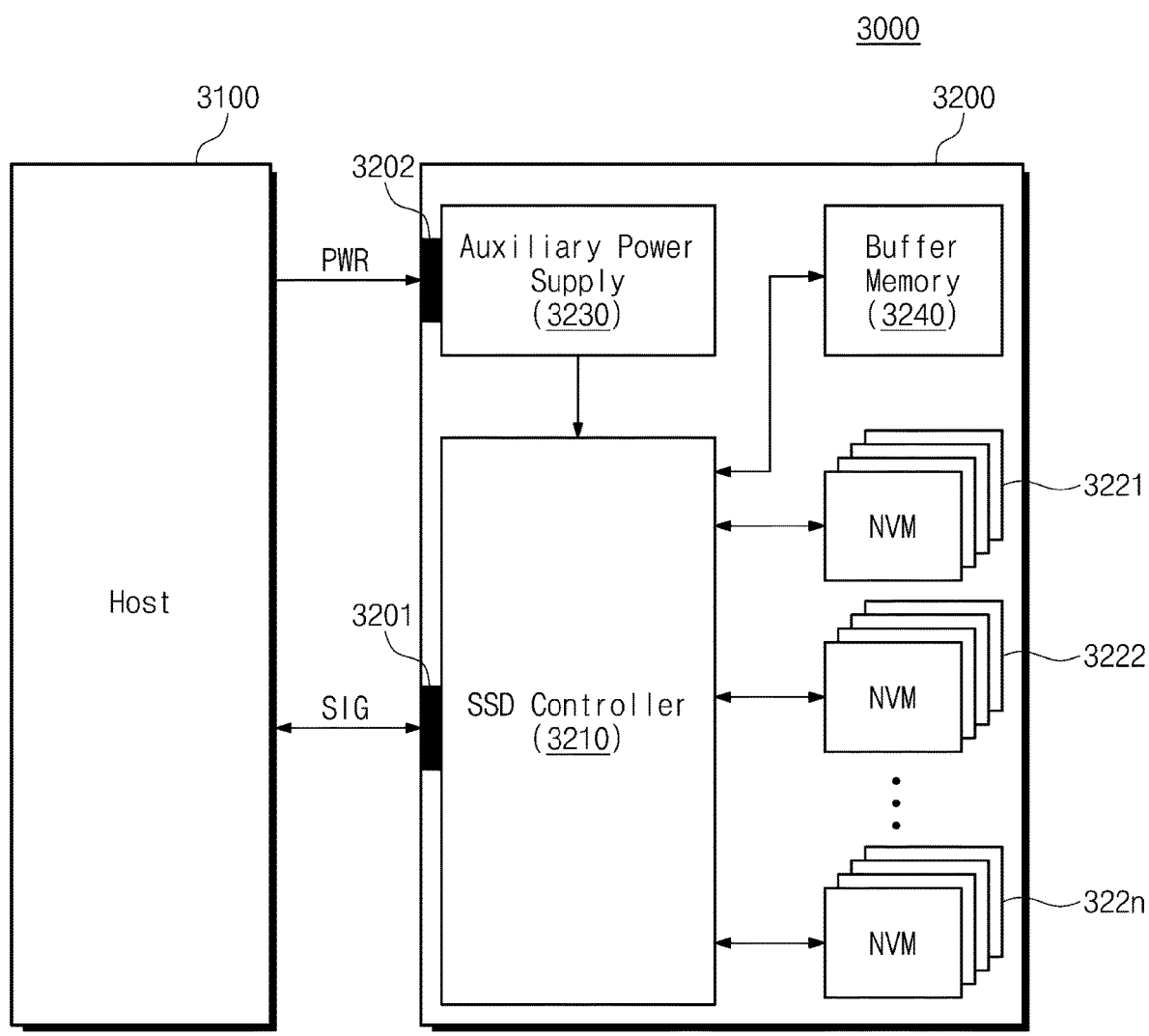
FIG. 15 is a block diagram illustrating a solid state drive (SSD) system to which a storage device according to an exemplary embodiment is applied.

FIG. 15 is a block diagram illustrating a solid state drive (SSD) system 3000 to which a storage device according to an exemplary embodiment is applied. Referring to FIG. 15, the SSD system 3000 includes a host 3100 and an SSD 3200.

The SSD 3200 exchanges signals SIG with the host 3100 through a signal connector 3201 and is supplied with power PWR through a power connector 3202. The SSD 3200 includes an SSD controller 3210, a plurality of flash memories 3221 to 322n, an auxiliary power supply 3230, and a buffer memory 3240.

The SSD controller 3210 may control the flash memories 3221 to 322n in response to the signal SIG from the host 3100. In an exemplary embodiment, the SSD controller 3210 may selectively deferred-process a command from the host 3100 based on the operation method described with reference to FIGS. 1 to 14.

The flash memories 3221 to 322n may operate under control of the SSD controller 3210. The auxiliary power supply 3230 is connected with the host 3100 through the power connector 3202. The auxiliary power supply 3230 may be charged by the power PWR from the host 3100. When the power PWR is not smoothly supplied from the host 3100, the auxiliary power supply 3230 may power the SSD 3200.

The buffer memory 3240 operates as a buffer memory of the SSD 3200. In an exemplary embodiment, as described with reference to FIGS. 1 to 14, the buffer memory 3240 may be a resource for command processing, which is managed by a resource pool.

As described above, according to the exemplary embodiments, a memory controller to control a nonvolatile memory device may calculate a delay time based on a currently available buffer, a previously available buffer, and a reference value and may deferred-process a command based on the calculated delay time. Alternatively, the memory controller may calculate a maximum delay time based on a buffer release rate and may deferred-process a command based on the calculated maximum delay time. As such, it may be possible to prevent a sharp delay of a command under a specific condition and to prevent reduction in performance of a storage device. This means that the performance of the storage device is improved.

According to the exemplary embodiments, a storage device or a memory controller may calculate a delay time based on the amount of resource (e.g., a write buffer) used and may selectively deferred-process a command based on the calculated delay time. As such, since an available write buffer is secured during the delay time, a sharp delay of a command under a specific condition may be prevented. Accordingly, it may be possible to provide an operation method of a memory controller and an operation method of a storage device, capable of improving performance.

While the exemplary embodiments has been described with reference to embodiments, it will be apparent to those skilled in the art that various changes and modifications may be made without departing from the spirit and scope of the exemplary embodiments. Therefore, it should be understood that the above embodiments are not limiting, but illustrative.

What is claimed is:

1. A method of operating a memory controller which is configured to control a nonvolatile memory device, the method comprising:

in response to receiving each write command from an external device, calculating a delay time required for the memory controller to increase a currently available size of a write buffer of the memory controller to at least a reference size, based on the currently available size of the write buffer, a previously available size of the write buffer processing a previous write command, and the reference size;

increasing the currently available size of the write buffer to at least the reference size during the delay time;

allocating space in the write buffer having at least the reference size; and storing write data of the write command in the space in the write buffer.

2. The method of claim 1, wherein the currently available size of the write buffer represents a first size of the write buffer at a first time point when the write command is received, and the previously available size of the write buffer represents a second size of write buffer before the first time point when the previous write command is received.

3. The method of claim 1, wherein the delay time increases as the reference size minus the currently available size of the write buffer increases, and wherein the delay time increases as the previously available size of the write buffer minus of the currently available size of the write buffer increases.

4. The method of claim 1, wherein the write command is processed after the delay time has elapsed from a time point when the write command is received.

5. The method of claim 1, further comprising:

if the currently available size of the write buffer is greater than the reference size or the delay time is smaller than a specific value, allocating the space in the write buffer and storing the write data of the write command in the space of the write buffer without increasing the currently available size of the write buffer to at least the reference size.

6. The method of claim 5, further comprising:

transmitting a response to the write command to the external device, after storing the write data of the write command in the space of the write buffer.

7. The method of claim 5, further comprising:

writing the write data stored in the space in the write buffer to the nonvolatile memory device.

8. The method of claim 1, further comprising queuing the write command received from the external device in a command queue.

9. A method of operating a memory controller which is configured to control a nonvolatile memory device, the method comprising:

in response to receiving each write command from an external device, calculating a first delay time required for the memory controller to increase a currently available size of a write buffer of the memory controller to at least a reference size, based on the currently available size of the write buffer, a previously available size of the write buffer, and the reference size;

calculating a maximum delay time based on a write buffer release rate representing a difference between a first amount of the write buffer released per unit time and a second amount of the write buffer allocated per unit time;

if the first delay time is greater than the maximum delay time, increasing the currently available size of the write buffer to at least the reference size during the maximum delay time;

if the first delay time is less than the maximum delay time, increasing the currently available size of the write buffer to at least the reference size during the delay time;

allocating space in the write buffer having at least the reference size; and storing write data of the write command in the space in the write buffer.

10. The method of claim 9, wherein the write buffer release rate decreases if a maintenance operation is performed on the nonvolatile memory device.

11. The method of claim 10, wherein the maximum delay time decreases as the first amount of the write buffer release rate increases.

12. The method of claim 9, wherein the first delay time increases as the reference size minus the currently available size of the write buffer increases, and wherein the first delay time increases as the previously available size of the write buffer minus the currently available size of the write buffer increases.

13. The method of claim 9, further comprising:

if the first delay time is greater than the maximum delay time, allocating the space in the write buffer and storing the write data of the write command in the space of the write buffer without increasing the currently available size of the write buffer to at least the reference size before the maximum delay time has elapsed; and if the first delay time is not greater than the maximum delay time, allocating the space in the write buffer and storing the write data of the write command in the space of the write buffer without increasing the currently available size of the write buffer to at least the reference size after the first delay time has elapsed.

14. The method of claim 9, further comprising:

if the currently available size of the write buffer is greater than the reference size or the first delay time is smaller than a specific value, allocating the space in the write buffer and storing the write data of the write command in the space of the write buffer without increasing the currently available size of the write buffer to at least the reference size.

* * * * *